United States Patent
Wang et al.

(10) Patent No.: US 10,880,940 B2
(45) Date of Patent: Dec. 29, 2020

(54) DUAL-CONNECTIVITY ESTABLISHMENT METHOD AND DEVICE

(71) Applicant: Samsung Electronics Co., Ltd., Suwon-si (KR)

(72) Inventors: Hong Wang, Beijing (CN); Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/743,557

(22) Filed: Jan. 15, 2020

(65) Prior Publication Data

US 2020/0154498 A1    May 14, 2020

Related U.S. Application Data

(63) Continuation of application No. PCT/KR2018/009177, filed on Aug. 10, 2018.

(30) Foreign Application Priority Data

Aug. 11, 2017 (CN) ............... 2017 1 0683643

(51) Int. Cl.
*H04W 76/15* (2018.01)
*H04W 76/12* (2018.01)
(Continued)

(52) U.S. Cl.
CPC ....... *H04W 76/15* (2018.02); *H04W 28/0257* (2013.01); *H04W 76/11* (2018.02);
(Continued)

(58) Field of Classification Search
CPC ..... H04W 76/15; H04W 76/12; H04W 76/11; H04W 28/0257; H04W 80/08; H04W 84/20
See application file for complete search history.

(56) References Cited

U.S. PATENT DOCUMENTS

2015/0296408 A1* 10/2015 Furuta ............... H04W 28/12
370/232
2016/0135174 A1   5/2016 Lee et al.
(Continued)

FOREIGN PATENT DOCUMENTS

| EP | 3 656 150 A1 | 5/2020 |
|----|---|---|
| WO | 2015/108291 A1 | 7/2015 |
| WO | 2019/031901 A1 | 2/2019 |

OTHER PUBLICATIONS

'3rd Generation Partnership Project; Technical Specification Group Radio Access Network; NR; NR and NG-RAN Overall Description; Stage 2 (Release 15)', 3GPP TS 38.300 V0.6.0, Aug. 7, 2017.
(Continued)

*Primary Examiner* — Samina F Choudhry
(74) *Attorney, Agent, or Firm* — Jefferson IP Law, LLP

(57) ABSTRACT

Embodiments of the present invention provide a dual-connectivity (DC) establishment method and device. The first DC architecture includes a Master Node (MN) and a Secondary Node (SN), wherein the SN includes a Central Unit (CU) and a Distributed Unit (DU); and, the CU includes a Control Plane functional entity (CP) and a User Plane functional entity (UP). The method includes steps of: receiving, by an SN-CP, a first SN setup request message transmitted by an MN; transmitting a first resource setup request message to an SN-UP according to the first SN setup request message, and receiving a first resource setup response message transmitted by the SN-UP; and, transmitting, by the SN-CP, a first bearer setup request message to an SN-DU, and receiving a first bearer setup response message transmitted by the SN-DU.

18 Claims, 19 Drawing Sheets

(51) Int. Cl.
 H04W 76/11 (2018.01)
 H04W 76/27 (2018.01)
 H04W 28/02 (2009.01)
 H04W 80/08 (2009.01)
 H04W 84/20 (2009.01)
(52) U.S. Cl.
 CPC ........... *H04W 76/12* (2018.02); *H04W 76/27* (2018.02); *H04W 80/08* (2013.01); *H04W 84/20* (2013.01)

(56) References Cited

U.S. PATENT DOCUMENTS

2016/0323805 A1 11/2016 Ryu et al.
2017/0019821 A1 1/2017 Zhang et al.
2018/0270713 A1* 9/2018 Park .................... H04L 5/0053

OTHER PUBLICATIONS

'3rd Generation Partnership Project; Technical Specification Group Radio Access Network; Study on New Radio (NR) access technology (Release 14)', 3GPP TR 38.912 V14.1.0, Aug. 3, 2017.
International Search Report and Written Opinion dated Nov. 13, 2018, issued in International Patent Application No. PCT/KR2018/009177.
Extended European Search Report dated Jul. 8, 2020, issued in European Application No. 18843558.0.

* cited by examiner

DUAL-CONNECTIVITY ESTABLISHMENT METHOD AND DEVICE

CROSS-REFERENCE TO RELATED APPLICATION(S)

This application is a continuation application, claiming priority under § 365(c), of an International application No. PCT/KR2018/009177, filed on Aug. 10, 2018, which was based on and claimed the benefit of a Chinese patent application number 201710683643.4, filed on Aug. 11, 2017, in the Chinese Intellectual Property Office, the disclosure of which is incorporated by reference herein in its entirety

TECHNICAL FIELD

The present invention relates to the technical field of wireless communication, and in particular to a dual-connectivity establishment method and device.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE

Technical Problem

For a Central Unit (CU) and a Distributed Unit (DU), the CU is further divided into Control Plane functional entity (CP) s, and the dual-connectivity (DC) method currently defined in the UP architecture is not applicable to new architectures. Therefore, how to support DC establishment becomes a technical problem to be urgently solved.

Technical Solution

The present invention provides a dual-connectivity (DC) establishment method, which is applied to a first DC architecture, the first DC architecture comprising a Master Node (MN) and a Secondary Node (SN), wherein the SN comprises a Central Unit (CU) and a Distributed Unit (DU); the CU comprises a Control Plane functional entity (CP) and a User Plane functional entity (UP), and, the DC establishment method comprises receiving, by a CP of an SN (SN-CP), a first SN setup request message transmitted by an MN, transmitting, by the SN-CP, a first resource setup request message to a UP of the SN (SN-UP) according to the first SN setup request message, receiving, by the SN-CP, a first resource setup response message transmitted by the SN-UP, transmitting, by the SN-CP, a first bearer setup request message to an SN-DU and receiving, by the SN-CP, a first bearer setup response message transmitted by the SN-DU.

Advantageous Effects

By the method of the present application, dual-connectivity (DC) establishment is realized in the architecture where the CU is further divided into a CP and a UP.

DESCRIPTION OF DRAWINGS

The above and/or additional aspects and advantageous of the present invention will become apparent and be more readily appreciated from the following descriptions of embodiments, with reference to the accompanying drawings, in which.

BEST MODE

Figure 1:
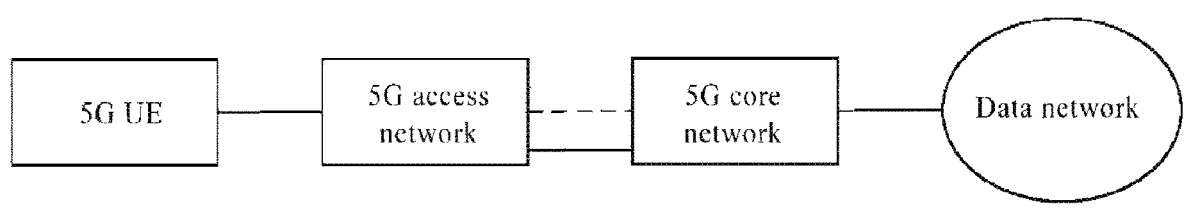
FIG. 1 is an architecture diagram of a 5G system according to an embodiment of the present invention.

To overcome or at least partially solve the technical problems, the following technical solutions are particularly provided.

According to one aspect, the embodiments of the present invention provide a dual-connectivity (DC) establishment method, which is applied to a first DC architecture, the first DC architecture including a Master Node (MN) and a Secondary Node (SN), wherein the SN includes a Central Unit (CU) and a Distributed Unit (DU); the CU includes a Control Plane functional entity (CP) and a User Plane functional entity (UP); and, the DC establishment method includes:

receiving, by an SN-CP, a first SN setup request message transmitted by an MN;

transmitting, by the SN-CP, a first resource setup request message to an SN-UP according to the first SN setup request message;

receiving, by the SN-CP, a first resource setup response message transmitted by the SN-UP;

transmitting, by the SN-CP, a first bearer setup request message to an SN-DU; and receiving, by the SN-CP, a first bearer setup response message transmitted by the SN-DU.

According to another aspect, the embodiments of the present invention provide another dual-connectivity (DC) establishment method, which is applied to a second DC architecture, the second DC architecture including a Master Node (MN) and a Secondary Node (SN), wherein the SN includes a Central Unit (CU) and a Distributed Unit (DU); the CU includes a Control Plane functional entity (CP) and a User Plane functional entity (UP); and, the DC establishment method includes:

receiving, by an SN-CP, a second SN setup request message transmitted by an MN;

transmitting, by the SN-CP, a second bearer setup request message to an SN-DU according to the second SN setup request message;

receiving, by the SN-CP, a second bearer setup response message transmitted by the SN-DU;

transmitting, by the SN-CP, a second resource setup request message to an SN-UP; and receiving, by the SN-CP, a second resource setup response message transmitted by the SN-UP.

According to still another aspect, the embodiments of the present invention provide a DC establishment method, which is applied to a third dual-system architecture, the third dual-system architecture including a Master Node (MN) and a Secondary Node (SN), wherein the MN includes a Central Unit (CU) and a Distributed Unit (DU); the CU includes a Control Plane functional entity (CP) and a User Plane functional entity (UP); and, the DC establishment method includes:

transmitting, by an MN-CP, a third bearer setup request message to an MN-DU;

receiving, by the MN-CP, a third bearer setup response message transmitted by the MN-DU;

transmitting, by the MN-CP, a third SN setup request message to an SN; and receiving, by the MN-CP, a third SN setup response message transmitted by the SN.

According to still another aspect, the embodiments of the present invention provide a DC establishment method, which is applied to a third dual-system architecture, the third dual-system architecture including a Master Node (MN) and a Secondary Node (SN), wherein the MN is a gNB, and the SN is an LTE node or a gNB, the MN includes a Central Unit (CU) and a Distributed Unit (DU); the CU includes a Control Plane functional entity (CP) and a User Plane functional entity (UP); and, the DC establishment method includes:

transmitting, by an MN-CP, a fourth SN setup request message to an SN;

receiving, by the MN-CP, a fourth SN setup response message transmitted by the SN;

transmitting, by the MN-CP, a fourth bearer setup request message to an MN-DU; and receiving, by the MN-CP, a fourth bearer setup response message transmitted by the MN-DU.

According to still another aspect, the embodiments of the present invention provide a DC establishment device, which is applied to a first DC architecture, the first DC architecture including a Master Node (MN) and a Secondary Node (SN), wherein the SN includes a Central Unit (CU) and a Distributed Unit (DU); the CU includes a Control Plane functional entity (CP) and a User Plane functional entity (UP); and, the device includes a first receiving module and a first transmitting module, wherein:

the first receiving module is configured to receive a first SN setup request message transmitted by an MN, and further configured to receive a second SN setup request message transmitted by the MN;

the first transmitting module is configured to transmit a first resource setup request message to an SN-UP according to the first SN setup request message, and further configured to transmit a second bearer setup request message to an SN-DU according to the second SN setup request message;

the first receiving module is further configured to receive a first resource setup response message transmitted by the SN-UP, and further configured to transmit a second resource setup request message to the SN-UP;

the first transmitting module is further configured to transmit a first bearer setup request message to the SN-DU, and further configured to transmit a second bearer setup request message to the SN-DU according to the second SN setup request message; and the first receiving module is further configured to receive a first bearer setup response message transmitted by the SN-DU, and further configured to receive a second resource setup response message transmitted by the SN-UP.

According to still another aspect, the embodiments of the present invention provide a DC establishment device, which is applied to a second dual-system architecture, the second dual-system architecture including a Master Node (MN) and a Secondary Node (SN), wherein the MN is a gNB, the MN includes a Central Unit (CU) and a Distributed Unit (DU); the CU includes a Control Plane functional entity (CP) and a User Plane functional entity (UP); and, the device includes a second transmitting module and a second receiving module, wherein:

the second transmitting module is configured to transmit a third bearer setup request message to an MN-DU, and further configured to transmit a fourth SN setup request message to an SN;

the second receiving module is further configured to receive a third bearer setup response message transmitted by the MN-DU, and further configured to receive a fourth SN setup response message transmitted by the SN;

the second transmitting module is configured to transmit a third SN setup request message to the SN, and further configured to transmit a fourth bearer setup request message to the MN-DU; and the second receiving module is further configured to receive a third SN setup response message transmitted by the SN, and further configured to receive a fourth bearer setup response message transmitted by the MN-DU.

The present invention provides a DC establishment method and device. Compared with the prior art, the present invention is applied to a first DC architecture. The first DC architecture includes a Master Node (MN) and a Secondary Node (SN), wherein the SN includes a Central Unit (CU) and a Distributed Unit (DU); and, the CU includes a Control Plane functional entity (CP) and a User Plane functional entity (UP). An SN-CP receives a first SN setup request message transmitted by an MN; then, transmits a first resource setup request message to an SN-UP according to the first SN setup request message, and receives a first resource setup response message transmitted by the SN-UP; and, transmits a first bearer setup request message to an SN-DU, and receives a first bearer setup response message transmitted by the SN-DU. Therefore, for the CU and the DU, the DC establishment is realized in the architecture where the CU is further divided into a CP and a UP.

The present invention provides a DC establishment method and device. Compared with the prior art, the present invention is applied to a first DC architecture. The first DC architecture includes a Master Node (MN) and a Secondary Node (SN), wherein the SN includes a Central Unit (CU) and a Distributed Unit (DU); and, the CU includes a Control Plane functional entity (CP) and a User Plane functional entity (UP). An SN-CP receives a second SN setup request message transmitted by an MN; then, transmits a second bearer setup request message to an SN-DU according to the second SN setup request message, and receives a second bearer setup response message transmitted by the SN-DU; and, transmits a second resource setup request message to an SN-UP, and receives a second resource setup response message transmitted by the SN-UP. Therefore, for the CU and the DU, the DC establishment is realized in the architecture where the CU is further divided into a CP and a UP.

The present invention provides a DC establishment method and device. Compared with the prior art, the present invention is applied to a second dual-system architecture. The second dual-system architecture includes a Master Node (MN) and a Secondary Node (SN), wherein the MN includes a Central Unit (CU) and a Distributed Unit (DU); and, the CU includes a Control Plane functional entity (CP) and a User Plane functional entity (UP). An MN-CP transmits a third bearer setup request message to an MN-DU and receives a third bearer setup response message transmitted by the MN-DU; and then, transmits a third SN setup request message to an SN and receives a third SN setup response message transmitted by the SN. Or, the MN-CP transmits a fourth SN setup request message to the SN and receives a fourth SN setup response message transmitted by the SN; and then, transmits a fourth bearer setup request message to the MN-DU and receives a fourth bearer setup response message transmitted by the MN-DU. Therefore, for the CU and the DU, the DC establishment is realized in the architecture where the CU is further divided into a CP and a UP.

Additional aspects and advantages of the present invention will be partially appreciated and become apparent from the descriptions below, or will be well learned from the practices of the present invention.

MODE FOR INVENTION

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "terminal" and "terminal apparatus" as used herein compasses not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

The 5th-Generation (5G) refers to the fifth-generation mobile communication technology. Different from the previous four generations, 5G is not a single wireless technology but a fusion of existing wireless communication technologies. At present, the peak rate in the Long-Term Evolution (LTE) can be up to 100 Mbps; however, the peak rate in the 5G will be up to 10 Gbps, which is improved by 100 times in comparison to the 4th-Generation (4G). Due to the limited spontaneous processing capability, the existing 4G network is unable to support some services, such as high-definition video, high-quality voice, augmented reality and virtual reality. 5G will introduce more advanced technologies, satisfy the demands for traffic growth of mobile services by higher spectrum efficiency, more spectrum resources, denser cells or more, solve the problems in the 4G network, and establish a network with high transmission rate, high capacity, low delay, high reliability and excellent user experience. As shown in FIG. 1, the 5G architecture contains a 5G access network and a 5G core network, and a UE communicates with a data network through the access network and the core network.

In the network evolution, LTE nodes will be continuously used in the first stage; meanwhile, the LTE nodes can support 5G terminals, and can use 5G features. Therefore, some 5G nodes are deployed. These nodes can be used as secondary nodes, which cooperate with the LTE nodes to provide data transmission for UEs. There is no signaling connection between a 5G node and a Mobility Management Entity (MME), and there is a user plane connection only between the 5G node and a Serving Gate Way (SGW). In this architecture, the LTE nodes and the LTE core network can be reused. This is attractive to operators and also expected by the operators. Specifically, an LTE node configures a 5G node, and performs data transmission with a UE by the dual-connectivity (DC) technology defined in the LTE system. The LTE node is used as a master node, while the 5G node is used as a secondary node.

Figure 2:
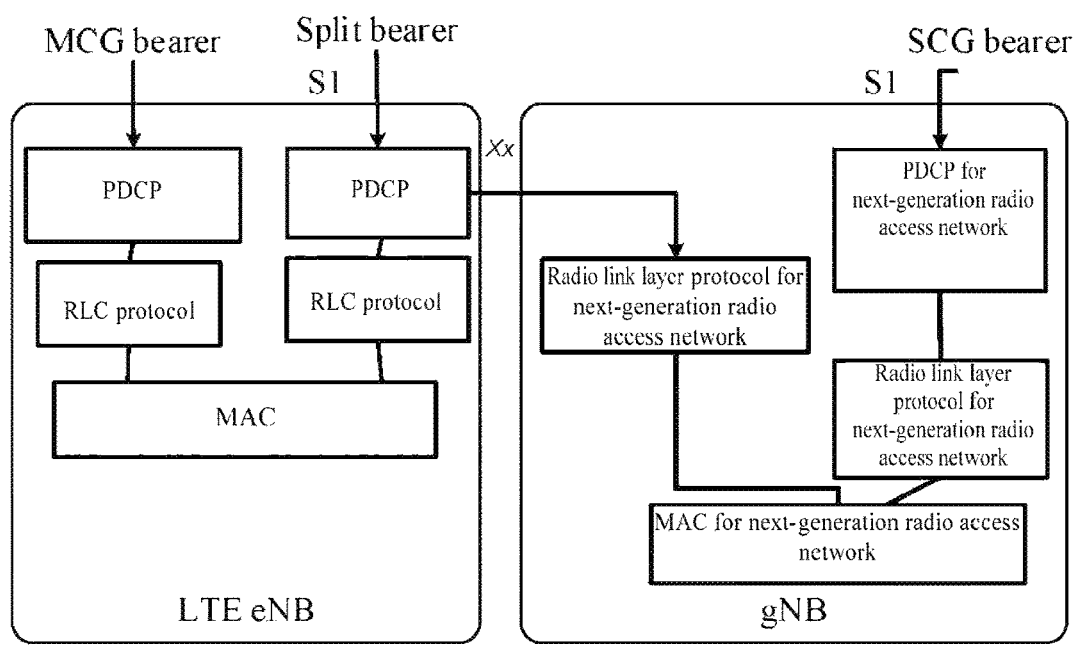
FIG. 2 is a diagram of a dual-connectivity (DC) architecture according to an embodiment of the present invention.

The type of DC can be various bearer types. As shown in FIG. 2, a bearer for data transmission can be a split bearer, a Secondary Cell Group (SCG) bearer or an SCG split bearer. The split bearer refers that the master node receives data from the core network, the data is split into two paths, and one path is transmitted from the master node to a UE while the other path is transmitted from the secondary node to the UE. The SCG bearer refers that the secondary node receives data from the core network and the data is transmitted to the UE by the secondary node. The SCG split bearer refers that the secondary node receives data from the core network, the data is split into two parts, and one part of data is transmitted to the UE by the secondary node while the other part of data is transmitted to the master node and then transmitted to the UE by the master node. The DC can also be established during the transmission of signaling. At present, it is only supported that an RRC signaling of the master node can be simultaneously transmitted to the UE from both the master node and the secondary node, so that the signaling is called a master cell group split SRB. Different Radio Resource Control (RRC) messages can be transmitted; or, one RRC message can be split into two parts, then transmitted to the UE from the master node and the secondary node respectively and recombined by the UE; or, a same RRC message is simultaneously transmitted to the UE from the master node and the secondary node. Since a Packet Data Convergence Protocol (PDCP) layer has a duplication function, one RRC message can be duplicated to form two parts, and the two parts of data are processed by the Radio Link Control (RLC)/Multiple Access Control (MAC) of the master node and the secondary node and then transmitted to the UE through physical layers, respectively.

In the 5G architecture, with the development demand of the wireless technology, functional modules originally located on a same node are separated from each other. Some functional modules are closer to a user, while other functional modules are pooled, virtualized and deployed centrally. In other words, nodes may be classified into two parts, where one part of nodes is Central Units (CUs) while the other part of nodes is Distributed Units (DUs). The DUs are closer to the user, and the CUs are away from antennas. Accordingly, the multi-antenna connection can be supported, and the network performance can be improved. One CU can be connected to multiple DUs, and the functions on the CU can be virtualized. A CU and a DU are connected by Fronthaul. The Fronthaul connection is mainly a connection from the DU to the CU. The RRC and PDSP functions are realized on the CU, and the RLC and MAC functions are realized on the DU. The CU can be further divided into a control plane functional entity (referred to as a CU-CP or a CP hereinafter) and a user plane functional entity (referred to as a CU-UP or a UP). The CP and the UP can be individual physical entities, and there is an open interface between the physical entities.

For the CU and the DU, the CU is further divided into CPs, and the DC method currently defined in the UP architecture is not applicable to new architectures. Therefore, how to support DC establishment becomes a technical problem to be urgently solved.

Embodiment 1

Figure 3:
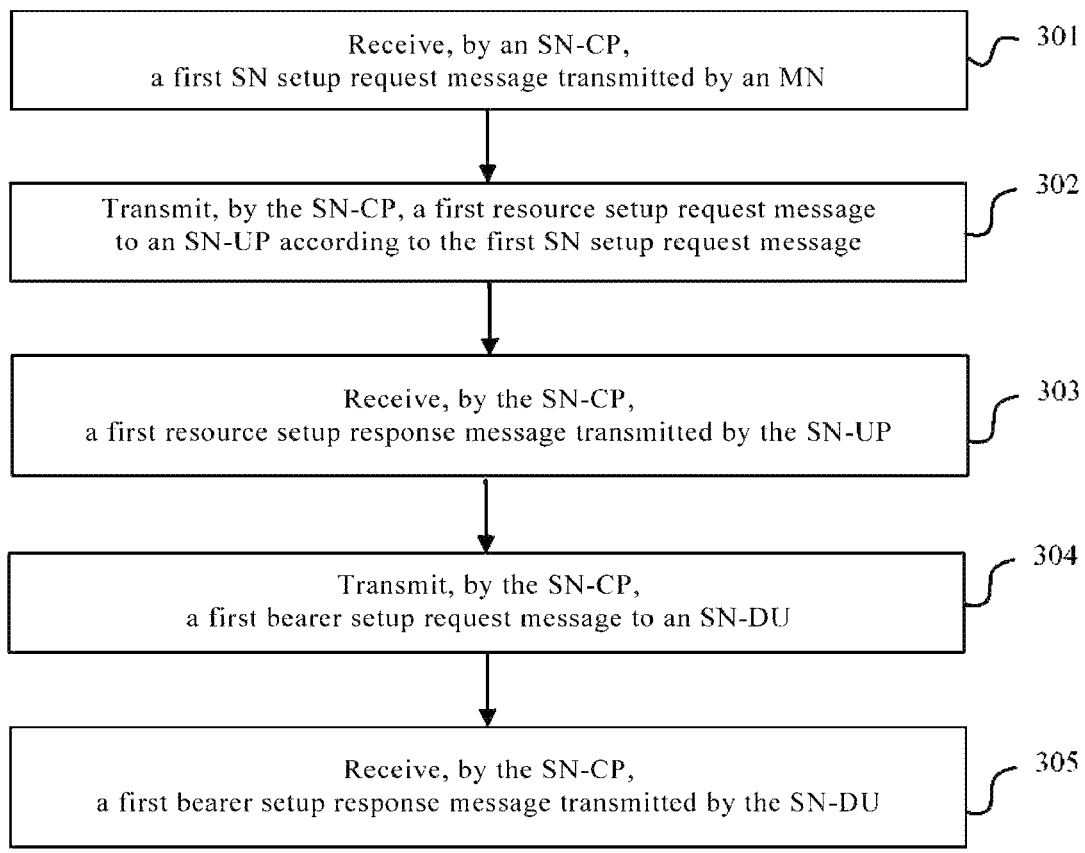
FIG. 3 is a flowchart of a DC establishment method according to Embodiment 1 of the present invention.

FIG. 3 shows a flowchart of a dual-connectivity (DC) establishment method according to Embodiment 1 of the present invention, which is applied to a first DC architecture. The first DC architecture includes a Master Node (MN) and a Secondary Node (SN), wherein the SN includes a Central Unit (CU) and a Distributed Unit (DU), and the CU includes a Control Plane functional entity (CP) and a User Plane functional entity (UP). The DC establishment method includes the following steps.

Step 301: an SN-CP receives a first SN setup request message transmitted by an MN; step 302: the SN-CP transmits a first resource setup request message to an SN-UP according to the first SN setup request message; step 303: the SN-CP receives a first resource setup response message transmitted by the SN-UP; step 304: the SN-CP transmits a first bearer setup request message to an SN-DU; and, step 305: The SN-CP receives a first bearer setup response message transmitted by the SN-DU.

The first resource setup request message includes at least one of the following: an identifier of a cell in which a bearer is to be established; an identifier corresponding to a UE for which a resource is to be established or modified; an identifier of a bearer or an identifier of a Packet Data Convergence Protocol (PDCP) stack; encrypted information and configuration information of the PDCP; an address for receiving uplink (UL) data; an address for receiving downlink (DL) data; the type of a first bearer; and PDCP operation indication information.

The type of a first bearer may include: an ordinary data bearer, a Secondary Cell Group (SCG) bearer, or an SCG split bearer; or, the type of the first bearer may include: an SCG bearer or an SCG split bearer.

The first bearer setup request message includes at least one of the following: the type of a second bearer; identifier information of a data bearer; identifier information of a signaling bearer; information indicating whether a signaling bearer is a split signaling bearer; Aggregate Maximum Bit Rate (AMBR); and, an address for receiving uplink data of a bearer.

The type of a second bearer may include: a data bearer, a signaling bearer and/or a split signaling bearer.

Further, the method further includes: transmitting, by the SN-CP, a first bearer modification request message to the SN-UP; and, receiving, by the SN-CP, a first bearer modification response message transmitted by the SN-UP.

The first bearer modification request message includes at least one of the following: an identifier of the PDCP; an address for receiving downlink data; and, PDCP operation indication information.

Further, if the first resource setup request message carries an address for receiving downlink data and after the SN-CP transmits the first resource setup request message to the SN-UP, the address for receiving downlink data carried in the first resource setup request message is not served as an address for transmitting data by the SN-UP. Specifically, the SN-UP ignores the address for receiving downlink data in this step. Even if the address for receiving downlink data has been received, the SN-UP is temporarily unable to transmit the processed data to this address and waits for another activation command.

Further, if the first bearer modification request message carries an address for receiving downlink data and after the SN-CP transmits the first bearer modification request message to the SN-UP, the address for receiving downlink data carried in the first bearer modification request message is served as an address for transmitting data by the SN-UP.

This embodiment of the present invention provides a DC establishment method. Compared with the prior art, this embodiment of the present invention is applied to a first DC architecture. The first DC architecture includes an MN and an SN, wherein the SN includes a CU and a DU; and, the CU includes a CP and a UP. An SN-CP receives a first SN setup request message transmitted by an MN; then, transmits a first resource setup request message to an SN-UP according to the first SN setup request message, and receives a first resource setup response message transmitted by the SN-UP; and, transmits a first bearer setup request message to an SN-DU, and receives a first bearer setup response message transmitted by the SN-DU. Therefore, for the CU and the DU, the DC establishment is realized in the architecture where the CU is further divided into a CP and a UP.

Embodiment 2

Figure 4:
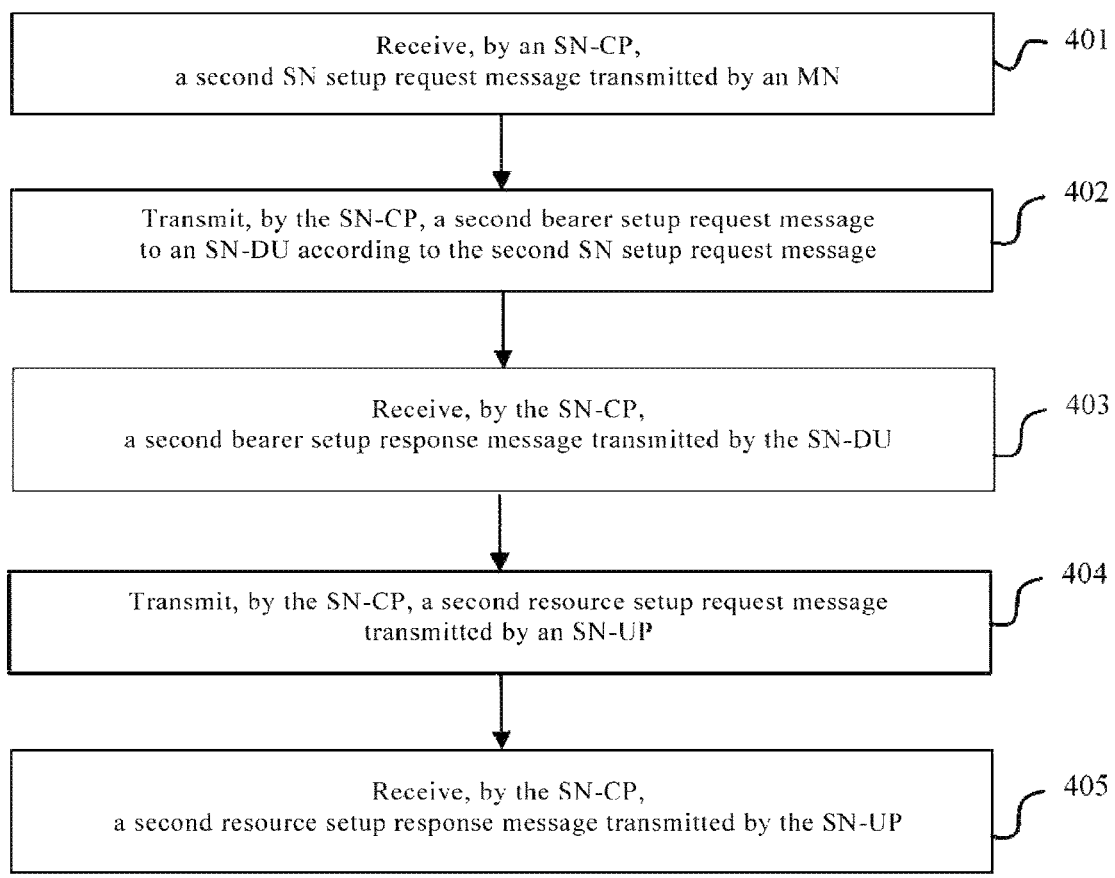
FIG. 4 is a flowchart of a DC establishment method according to Embodiment 2 of the present invention.

FIG. 4 shows a flowchart of a DC establishment method according to Embodiment 2 of the present invention. The DC establishment method is applied to a second DC architecture. The second DC architecture includes an MN and an SN, wherein the SN includes a CU and a DU, and the CU includes a CP and a UP. The DC establishment method includes the following steps.

Step 401: an SN-CP receives a second SN setup request message transmitted by an MN; step 402: the SN-CP transmits a second bearer setup request message to an SN-DU according to the second SN setup request message; step 403: the SN-CP receives a second bearer setup response message transmitted by the SN-DU; step 404: the SN-CP transmits a second resource setup request message to an SN-UP; and, step 405: The SN-CP receives a second resource setup response message transmitted by the SN-UP.

The second resource setup request message includes at least one of the following: an identifier of a cell in which a bearer is to be established; an identifier corresponding to a UE for which a resource is to be established or modified; an identifier of a bearer or an identifier of a PDCP stack; encrypted information and configuration information of the PDCP; an address for receiving uplink data; an address for receiving downlink data; and, PDCP operation indication information.

The PDCP operation indication information is used for indicating whether the processing to be performed on the PDCP is data splitting or data duplication.

The second bearer setup request message carries at least one of the following: the type of a bearer to be established, an address for receiving uplink data, a first piece of indication information and a second piece of indication information;

the type of a bearer to be established includes: an ordinary bearer, an SCG bearer, an SCG split bearer and/or a split bearer;

the first piece of indication information is used for indicating whether the bearer to be established is a split bearer; and the second piece of indication information is used for indicating whether the SN-DU ignores the address for receiving uplink data carried in the second bearer setup request message.

Further, if the second piece of indication information indicates that the SN-DU ignores the address for receiving uplink data carried in the second bearer setup request message, the address for receiving uplink data carried in the second bearer setup request message is not used as an address for transmitting data by the SN-DU. Specifically, the SN-DU ignores the address for receiving uplink data in this step. Even if the address for receiving uplink data has been received, the SN-DU is temporarily unable to transmit the processed data to this address and waits for another activation command.

Further, after the step of receiving, by the SN-CP, a second bearer setup response message transmitted by the SN-UP, the method further includes: transmitting, by the SN-CP, a second bearer modification request message to the SN-DU; and, receiving, by the SN-CP, a second bearer modification response message transmitted by the SN-DU.

The second bearer modification request message includes an address for receiving uplink data.

Further, after the SN-CP transmits a second bearer modification request message to the SN-UP, the address for receiving uplink data carried in the second bearer modification request message is used as an address for transmitting data by the SN-UP.

This embodiment of the present invention provides a DC establishment method. Compared with the prior art, this embodiment of the present invention is applied to a second DC architecture. The second DC architecture includes an MN and an SN, wherein the SN is a gNB; the SN includes a CU and a DU; and, the CU includes a CP and a UP. An SN-CP receives a second SN setup request message transmitted by an MN; then, transmits a second bearer setup request message to an SN-DU according to the second SN setup request message, and receives a second bearer setup response message transmitted by the SN-DU; and, transmits a second resource setup request message to an SN-UP, and receives a second resource setup response message transmitted by the SN-UP. Therefore, for the CU and the DU, the DC establishment is realized in the architecture where the CU is further divided into a CP and a UP.

Embodiment 3

Figure 5A:
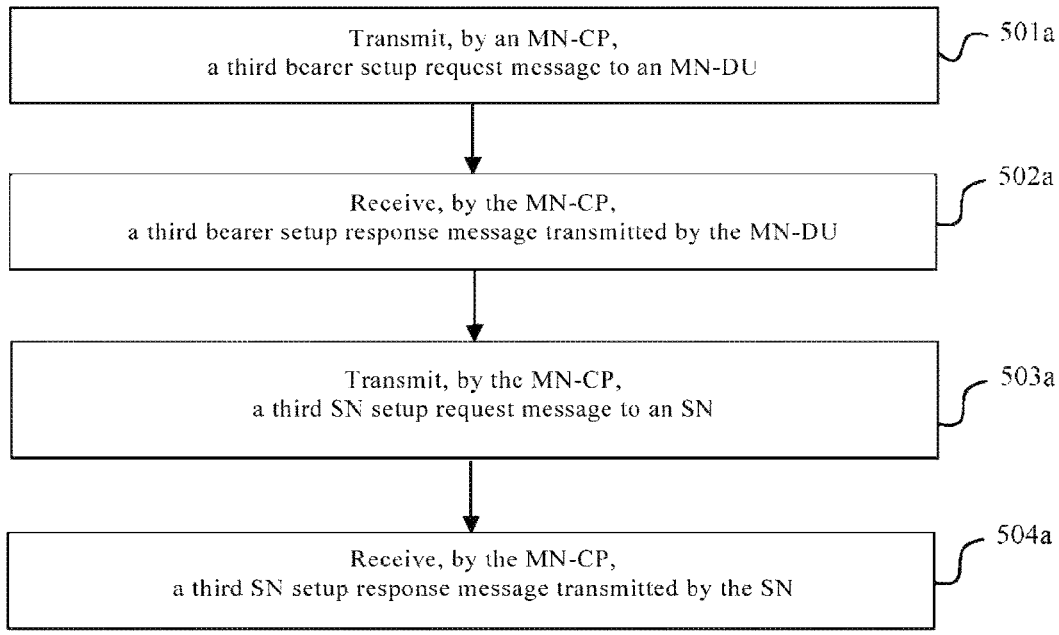
FIG. 5a is a flowchart of a DC establishment method according to Embodiment 3 of the present invention.

FIG. 5a shows a flowchart of a DC establishment method according to Embodiment 3 of the present invention. The flowchart of the DC establishment method is applied to a third dual-system architecture. The third dual-system architecture includes an MN and an SN, wherein the MN includes a CU and a DU, and the CU includes a CP and a UP. The DC establishment method includes the following steps.

Step 501a: an MN-CP transmits a third bearer setup request message to an MN-DU; step 502a: the MN-CP receives a third bearer setup response message transmitted by the MN-DU; step 503a: the MN-CP transmits a third SN setup request message to an SN; and, step 504a: the MN-CP receives a third SN setup response message transmitted by the SN.

The third bearer setup request message carries at least one of the following: the type of a bearer to be established, an address for receiving uplink data, and a third piece of indication information, where the type of a bearer to be established includes an ordinary bearer, a SCG bearer, an SCG split bearer and/or a split bearer; and the third piece of indication information is used for indicating whether the SN-DU ignores the address for receiving uplink data carried in the third bearer setup request message, or used for indicating that the SN-DU sets the address for receiving uplink data carried in the third bearer setup request message as a predefined address.

Further, the method further includes: determining, by the MN-CP, a mapping relationship between QoS flows and Data Radio Bearers (DRBs); and, transmitting, by the MN-CP, the determined mapping relationship between QoS flows and DRBs to the SN through the third SN setup request message.

Further, after the step of receiving, by the MN-CP, a third SN setup response message, the method further includes: transmitting, by the MN-CP, a third bearer modification request message to the MN-DU.

The third bearer modification request message carries a correct address for receiving uplink data, and the third bearer modification request message is used for indicating that the MN-DU begins to transmit uplink data according to the correct address for receiving uplink data.

This embodiment of the present invention provides a DC establishment method. Compared with the prior art, this embodiment of the present invention is applied to a second dual-system architecture. The second dual-system architecture includes an MN and an SN, wherein the MN includes a CU and a DU; and, the CU includes a CP and a UP. An MN-CP transmits a third bearer setup request message to an MN-DU and receives a third bearer setup response message transmitted by the MN-DU; and then, transmits a third SN setup request message to an SN and receives a third SN setup response message transmitted by the SN. Therefore, for the CU and the DU, the DC establishment is realized in the architecture where the CU is further divided into a CP and a UP.

Embodiment 4

Figure 5B:
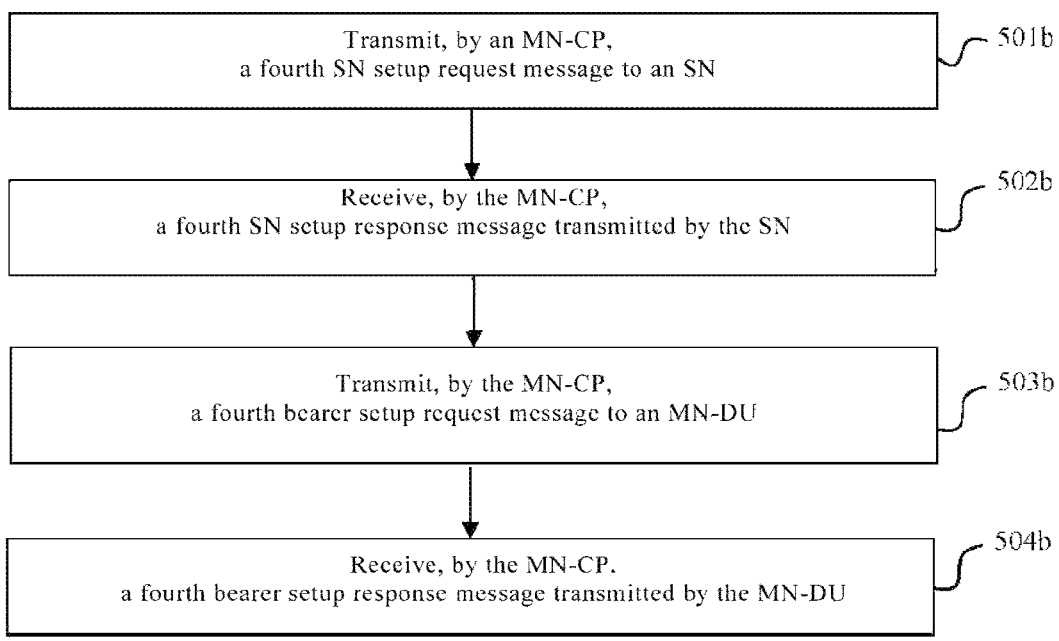
FIG. 5b is a flowchart of a DC establishment method according to Embodiment 4 of the present invention.

FIG. 5b shows a flowchart of a DC establishment method according to Embodiment 4 of the present invention. The flowchart of the DC establishment method is also applied to a third dual-system architecture. The third dual-system architecture includes an MN and an SN, wherein the MN includes a CU and a DU, and the CU includes a CP and a UP. The DC establishment method includes the following steps.

Step 501b: an MN-CP transmits a fourth SN setup request message to an SN; step 502b: the MN-CP receives a fourth SN setup response message transmitted by the SN; step 503b: the MN-CP transmits a fourth bearer setup request message to an MN-DU; and, step 504b: the MN-CP receives a fourth bearer setup response message transmitted by the MN-DU.

The fourth SN setup request message carries a fourth piece of indication information.

The fourth piece of indication information is used for indicating that an address for receiving uplink data and/or an address for receiving downlink data carried in the fourth SN setup request message is set as a predefined address, or used for indicating whether the SN-DU ignores an address for receiving uplink data and/or an address for receiving downlink data carried in the fourth SN setup request message.

Further, after the step of receiving, by the MN-CP, a fourth SN setup response message transmitted by the SN, the method further includes: transmitting, by the MN-CP, a fourth SN modification request message to the SN.

The fourth SN modification request message carries a correct address for receiving uplink data or a correct address for receiving downlink data, and the fourth SN modification request message is used for indicating that the SN begins to transmit uplink data or downlink data according to the correct address for receiving uplink data or the correct address for receiving downlink data.

This embodiment of the present invention provides a DC establishment method. Compared with the prior art, this embodiment of the present invention is applied to a second dual-system architecture. The second dual-system architecture includes an MN and an SN, wherein the MN includes a CU and a DU; and, the CU includes a CP and a UP. An MN-CP transmits a fourth SN setup request message to an SN and receives a fourth SN setup response message transmitted by the SN; and then, transmits a fourth bearer setup request message to an MN-DU and receives a fourth bearer setup response message transmitted by the MN-DU. Therefore, for the CU and the DU, the DC establishment is realized in the architecture where the CU is further divided into a CP and a UP.

Figure 6:
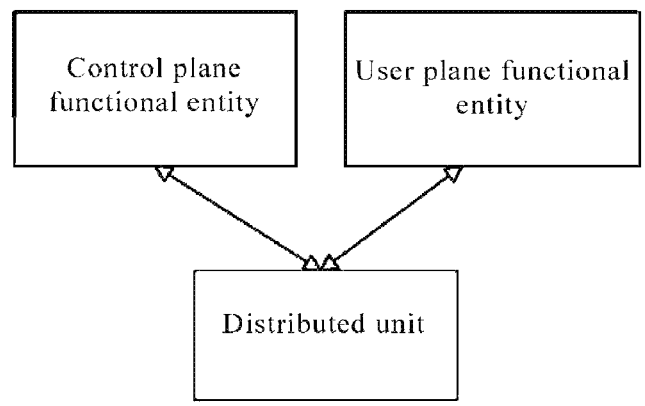
FIG. 6 is an architecture diagram of a node according to an embodiment of the present invention.

FIG. 6 is a diagram of an architecture on which the embodiments of the present invention are based. As shown in FIG. 6, RRC and/or PDCP functions are realized on a CU, and RLC and/or MAC and/or physical layer functions are realized on a DU. The CU can be further divided into a control plane functional entity (referred to as a CU-CP or a CP) and a user plane functional entity (referred to as a CU-UP or a UP). The CP and the UP can be individual physical entities, and there is an open interface between the physical entities. The CU-CP contains a control plane function. For example, a signaling (e.g., an X2 signaling or an Xn signaling) is transmitted or received from a horizontal interface to generate an RRC message. A Simple DFS Access Protocol (SDAP) layer and a PDCP layer of a data bearer are realized on the CU-UP. It is to be noted that, the RRC signaling is transmitted to the DU only after it is processed by the PDCP layer. In order to decrease the transmission path for signaling transmission, the PDCP protocol corresponding to the RRC signaling can be realized on the CU-CP. However, in terms of the clarity of functional partitioning, all PDCP functions are realized on the CU-UP. If all PDCP functions are realized on the CU-UP, some special processes need to be performed for the signaling setup. The CU-CP needs to notify the DU whether the signaling beater to be established is a split signaling bearer or an ordinary signaling bearer. Since a same identifier is used currently, the DU cannot distinguish the split signaling bearer from the ordinary signaling bearer.

Figure 7:
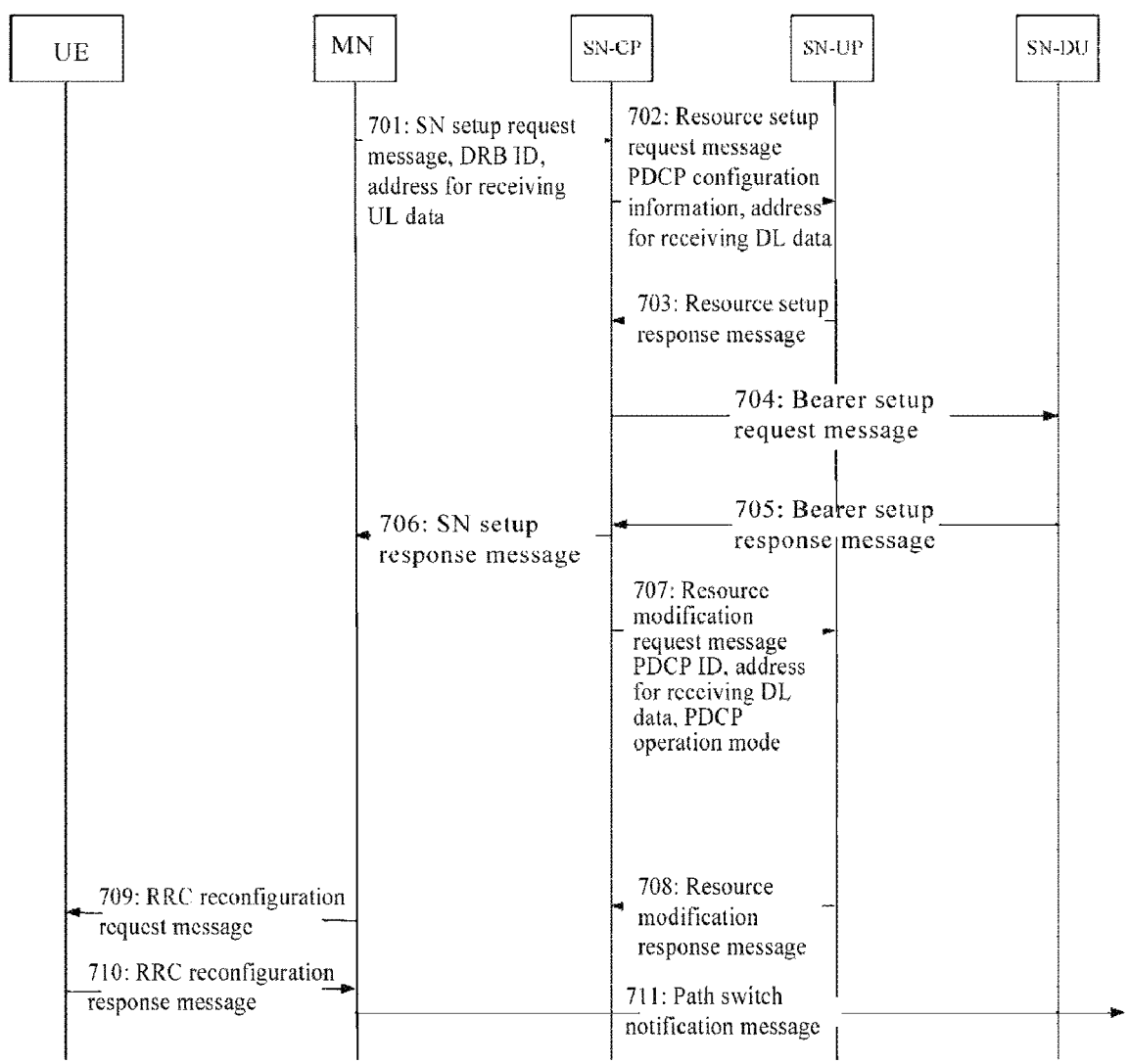
FIG. 7 is an interaction flowchart of DC establishment in a first instance of Embodiment 1 of the present invention.

In a first instance of Embodiment 1, how to establish an MCG split SRB in this architecture will be described, as shown in FIG. 7.

It is to be noted that, the first SN setup request message described in Embodiment 1 corresponds to an SN setup request message in step 701 in this embodiment; the first resource setup request message described in Embodiment 1 corresponds to a resource setup request message in step 702 in this embodiment; the first resource setup response message described in Embodiment 1 corresponds to a resource setup response message in step 703 in this embodiment; the first bearer setup request message described in Embodiment 1 corresponds to a bearer setup request message in step 704 in this embodiment; the first bearer setup response message described in Embodiment 1 corresponds to a bearer setup response message in step 705 in this embodiment; the first resource modification request message described in Embodiment 1 corresponds to a resource modification request message in step 707 in this embodiment; and, the first resource modification response message described in Embodiment 1 corresponds to a resource modification response message in step 708 in this embodiment.

Step 701: An MN transmits an SN setup request message to a CP of an SN.

In this embodiment of the present invention, both the MN and the SN can be LTE nodes or 5G gNBs. It is assumed that each of the MN and the SN contains three entities, i.e., a CP, a UP and a DU.

In this embodiment of the present invention, the MN decides to establish a certain bearer on the SN. The bearer may be previously established on a source SN or on the MN, or a new data bearer configured by a core network.

The SN setup request message contains an identifier of a data bearer, and a transport layer address for receiving uplink data and a Tunnel Endpoint Identifier (TEID) of the data bearer in the core network. This message further carries the capability information of a UE, and/or the type of connection determined by the MN. The type of dual-connection established on the SN can include a split bearer, an SCG bearer, a SCG split bearer and/or an MCG split signaling.

Specifically, the SN setup request message carries one or more pieces of the following information.

The type of the bearer: the type of the bearer can be set as a split bearer type, an SCG bearer type and/or an SCG split bearer type. This message can be further set as an MCG split signaling bearer.

Identifier information of the bearer: for example, the identifier information can be an identifier of a DRB or an identifier of a QoS flow to be on the SN.

The identifier of the QoS flow is transmitted to the MN by the core network. The core network transmits, to the MN and through an initial context setup process or an initial context modification process or a data connection process, the identifier of the QoS flow and the QoS corresponding to the identifier of the QoS flow, and/or an SRB identifier of the contained MCG split signaling bearer. For example, the SRB identifier of the MCG split signaling bearer can be SRB1 or SRB2.

QoS parameter of the bearer: the QoS parameter can be the QoS of a DRB. The QoS parameter contains a QoS Class Identifier (QCI), a priority Address Resolution Protocol (ARP), a maximum uplink/downlink rate of a Guaranteed Bit Rate (GBR) service, a guaranteed uplink/downlink rate of the GBR service, or the QoS corresponding to the QoS flow. The identifier of the QoS flow and the corresponding QoS are transmitted from the core network to the MN.

Aggregate Maximum Bit Rate (AMBR): the AMBR in this message is an AMBR of a non-guaranteed service on the SN determined by the MN. If the non-guaranteed service is established on both the MN and the SN, the sum of an AMBR on the MN and an AMBR on the SN does not exceed the total UE AMBR.

Address for uplink data: if the bearer is a split bearer, the address for receiving uplink data is a transport layer address for uplink data TEID (i.e. GTP TEID) allocated by the MN; and, if the bearer is an SCG bearer or an SCG split bearer, the address for uplink data is a transport layer address for receiving uplink data TEID allocated by the core network.

Address for downlink data: if the bearer is an SCG split bearer, this message further carries a transport layer address for downlink data TEID. The address for downlink data is an address allocated by the MN and used for downlink data from the SN.

RRC transparent container: the RRC transparent container can contain a measurement report of a UE; and, an identifier of an MCG split SRB and/or configuration information of corresponding layers as a RLC layer and an MAC layer can also be contained in the RRC transparent container.

Step 702: The SN-CP (hereinafter referred to as a CP) transmits a resource setup request message to an SN-UP (hereinafter referred to as a UP).

Upon receiving the SN setup request message, the SN-CP decides, according to the type of the bearer, whether to perform the step 702.

If a split bearer or an MCG split signaling is to be established, the step 702 will not be executed; however, if an SCG bearer or an SCG split bearer is to be established, the SN-CP transmits the message in the step 702 to the CN-UP.

The bearer setup request message contains one or more pieces of the following information.

- Identifier of a cell: the SN-CP determines to establish a bearer on which cell. The identifier of a cell can be obtained according to the measurement information of the UE received in the step 701, or obtained from the measurement information directly transmitted to the SN by the UE.
- Identifier of a UE: the SN-CP indicates that a resource for which UE is to be or modified. The identifier of the UE can be a unique identifier in a cell of the UE, or a unique identifier in a network of the UE (for example, P-TMGI or International Mobile Subscriber Identification (IMSI)), or a unique identifier between the CP and the UP; or, the UE is identified by a unique signaling of the UE between the CP and the UP.
- Identifier of the bearer or identifier of the PDCP stack, which can be an identifier of a data bearer, an identifier of a signaling bearer, or an identifier allocated for the UE by the CP to distinguish different PDCP stacks on the UP.

Since a UE has multiple PDCP stacks, each PDCP stack needs to have one identifier, so that the CP allocates one identifier for each PDCP stack.

- Encrypted information and configuration information of the PDCP: the algorithm for encrypting the PDCP is determined by the CP and then transmitted to the UP, the configuration information of the PDCP contains the format of the PDCP, the length of an SN of the PDCP, clock information of the PDCP (e.g., discarded clock length) or other information.
- Address for uplink data, which is a transport layer address and a TEID allocated by the user plane of the core network and used for and notifying uplink data transmitted by the UP.
- Address for downlink data.

Step 703: The SN-UP transmits a resource setup response message to the SN-CP.

The resource setup response information contains information about successful setup.

Step 704: The SN-CP transmits a bearer setup request message to a DU of the SN.

The bearer setup request message contains one or more pieces of the following information.

- The type of a bearer: the type of the current bearer can be a data bearer or a signaling bearer, and an interface between the CU and the DU is an F1 interface. The DU needs to know the bearer to be is a data bearer or a signaling bearer. If the bearer to be is a data bearer, a TEID needs to be allocated to the CU and the DU, a corresponding tunnel for each bearer is established between the CU and the DU, and a data packet is transmitted by the tunnel established for the bearer. If the bearer to be is a signaling bearer, an RRC message is transmitted between the CU and the DU through an F1 message. Therefore, it is necessary to notify the DU whether the type of the bearer is a data bearer or a signaling bearer.
- Identifier information of a data bearer: for example, the identifier information can be an identifier of a DRB or an identifier of a QoS flow to be established on the SN. The identifier of the QoS flow is transmitted to the MN by the core network. The core network transmits, to the MN and through an initial context setup or an initial context modification process or a data connection process, the identifier of the QoS flow and the QoS corresponding to the identifier of the QoS flow. Therefore, in the PDCP, on the CU, it is preferable to notify the DU of the identifier of the DRB.
- Identifier information of a signaling bearer, for example, SRB1 and/or SRB2.
- Configuration information of an RLC/MAC/physical corresponding to the bearer: here, the bearer can be a data bearer and/or a signaling bearer.
- Aggregate Maximum Bit Rate (AMBR): the AMBR in this message is an AMBR of a non-guaranteed service established on the SN determined by the MN. If the non-guaranteed service is established on both the MN and the SN, the sum of an AMBR on the MN and an AMBR on the SN does not exceed the total UE AMBR. The DU schedules the UE according to the received AMBR. Address for uplink data of a bearer: if this message needs to carry the DRB ID of the bearer and the address for uplink data corresponding to the bearer, the DU transmits uplink data on the corresponding address. When it is configured that bearer is an SCG split bearer, data is transmitted to the CP of the SN, and the address for uplink data is a transport layer address and a TEID allocated by the CU of the SN. When it is configured that bearer is an MCG split bearer, uplink data is to be transmitted to the MN, and the address for uplink data is a transport layer address and a TEID allocated by the MN.

In this embodiment of the present invention, in addition to the above information, the bearer setup request message further needs to carry the following new information.

(1) For an ordinary signaling bearer, i.e., in a non-DC mode, a Signaling Radio Bearer (SRB) configured for the UE can be set as SRB0, SRB1 or SRB2. If the CU is divided into two entities CP and UP and all PDCP functions are realized on the UP, for an ordinary signaling bearer, the UE processes an RRC signaling via a PDCP/RLC/MAC protocol layer and then transmits the RRC signaling to the DU. The DU receives a data packet from the UE, and then acquires, from an MAC header of the data packet, the RRC signaling carried in this data packet. Specifically, the DU acquires the RRC signaling by using the information of a logic channel contained in the MAC header. The MAC header contains an identifier of a logic channel, wherein the logic channel 0 corresponds to SRB0, the logic channel 1 corresponds to SRB1 and the logic channel 2 corresponds to SRB2. For the data packet containing the RRC signaling, the DU processes the received data packet through RLC, and then transmits the data packet which is processed by the RLC process to the UP; and, the data packet is processed by the PDCP on the UP and then transmitted to the CP by the UP. The RRC protocol layer of the CP can parse the contained RRC signaling.

If the DC is configured for the UE and when it is necessary to establish an MCG split signaling on the SN, that is, in order to bear information of the SRB1 or/and SRB1 on the MN, the UE processes the RRC signaling through the PDCP/RLC/MAC protocol layer and then transmits the RRC signaling which is processed by the PDCP/RLC/MAC protocol layer to the DU. The DU receives a data packet from the UE, and then acquires, form an MAC header of the data packet, the RRC signaling carried in this data packet. However, the DU does not know whether the RRC signaling is an MCG split signaling or an ordinary SRB. The DU should perform an operation on the MCG split signaling, which is different from the operation performed on the ordinary signaling. That is, the DU needs to transmit the MCG split signaling data packet to the MN, and the MCG split signaling data packet which are processed by the PDCP of the MN first are then are processed by the RRC protocol layer. In addition, for the MCG split SRB, the MN can configure that the MN and the SN transmits a same RRC message, i.e., performing PDCP duplication. The operation of the MAC of the MAC split SRB is different from the operation of the MAC layer of the ordinary SRB. Since the same SRB identifier is used, that is, the SRB1 and the SRB2 can be applied to an ordinary signaling bearer or applied to an MCG split signaling bearer, the DU is unable to distinguish the ordinary signaling bearer from the MCG split signaling bearer currently. In order to allow the DU to distinguish the ordinary signaling bearer from the MCG split signaling in the DC mode, during the setup of the bearer, the bearer setup request message transmitted to the DU by the CP also needs to carry indication information for indicating whether the bearer to be established is an ordinary signaling bearer or an MCG split signaling bearer.

The new indication information can be identified by one of the following methods.

I. A new type of the bearer is defined. At present, the type of the bearer can be a data bear or a signaling bearer. In order to indicate the above information, a new type of the bearer can be defined: a split signaling bearer. If the type of the bearer is set as a data bearer, after the DU receives the data packet transmitted by the UE, the data packet is processed by the MAC/RLC and then transmitted to a tunnel-related transport layer address through a corresponding tunnel. If the type of the bearer is set as an ordinary signaling bearer, and if the logic channel 0, the logic channel 1 and the logic channel 2 correspond to SRB0, SRB1 and SRB2, respectively, the DU transmits the data packet to the UP by using the identifier of the logic channel contained in the MAC header. If the type of the bearer is set as a split signaling bearer, and if the logic channel 1 and the logic channel 2 corresponds to a split signaling SRB1 and a split signaling SRB2, respectively, the DU transmits the data packet to the CP by using the identifier of the logic channel contained in the MAC header. In order to allow the UP to know the address of the UP, the bearer setup request message further carries a transport layer address of the UP or the identifier of the UP.

II. This massage indicates whether the bearer to be established is a split signaling bearer while indicating the identifier (e.g., SRB1 or SRB2) of the signaling bearer.

In this embodiment of the present invention, by using the identifier of the signaling bearer and the corresponding indication information, the DU can distinguish an ordinary signaling bearer from a split signaling bearer. For the ordinary signaling bearer, the DU transmits an RRC message to the UP; while for the split signaling bearer, the DU transmits a data packet to the CP. In order to allow the DU to know the address of the UP, the bearer setup request message further carries the transport layer address of the UP or the identifier of the UP.

III. This message carries an identifier of a data bearer for indicating that the data identifier bears an MCG split signaling bearer SRB1 or an MCG split signaling bearer SRB2.

Step 705: The DU transmits a bearer setup response message to the CP.

The bearer setup response message contains one or more pieces of the following information:

an identifier of a successfully established bearer, for example, which can be an identifier of a Data Radio Bearer (DRB) or an identifier of a QoS flow to be established on the SN; and, an address for receiving downlink data, where the address for receiving downlink data is allocated by the DU, an entity where the PDCP of the bearer is located needs to transmit data to the address for receiving downlink data allocated by the DU, and the CU is responsible for transmitting the address for receiving downlink data to a corresponding entity.

Step 707: The SN-CP may transmit a resource modification request to the SN-UP, where the message carries an address for receiving downlink data allocated by the DU which can be used for modifying the address for receiving data on the SN-UP.

Step 708: The SN-UP transmits a resource modification response message to the SN-CP.

Step 709: The MN transmits an RRC configuration request message to the UE.

Step 710: The UE transmits an RRC configuration completion message to the MN.

Step 711: The MN transmits a path switch notification message to the core network to notify the core network of the new address for receiving downlink data.

Embodiment 2

In the first stage, there is no signaling plane connection between a 5G node and an MME of an LTE core network, and there is only a data plane connection between the 5G node and a data gateway in the LTE core network; and, the 5G core network has not yet been deployed. Therefore, the 5G node can only be served as a secondary node for providing data for a UE, and cannot serve the UE independently. If the DC is established for the UE, the master node can only be an LTE node, while the secondary node is a 5G node which can provide a new Radio Access Technology (new RAT) at an air interface. This DC is also referred to as EN-DC, the 5G node (gNB) can use an architecture in which a CU and a DU are separated from each other, and the CU is further divided into a CP and a UP. The CU, the DU, the CP and the UP are called an SN-CU, an SN-DU, an SN-CP and an SN-UP hereinafter, respectively, where the SN represents the secondary node.

It is assumed that the RRC and the PDCP for RRC are realized on the SN-CP, and the PDCP for data is realized on the SN-UP. There are two DC establishment methods. The first method is as follows: the CP of the SN configures resources on the UP first, and then configures resources on the DU. The second method is as follows: the CP configures resources on the DU first, and then configures resources on the UP. The first method will be described in FIG. 9, and the second method will be described in FIG. 10.

Although the MN is described as an eNB in this embodiment, this embodiment is also applicable to a case where the MN is a gNB.

Figure 8:
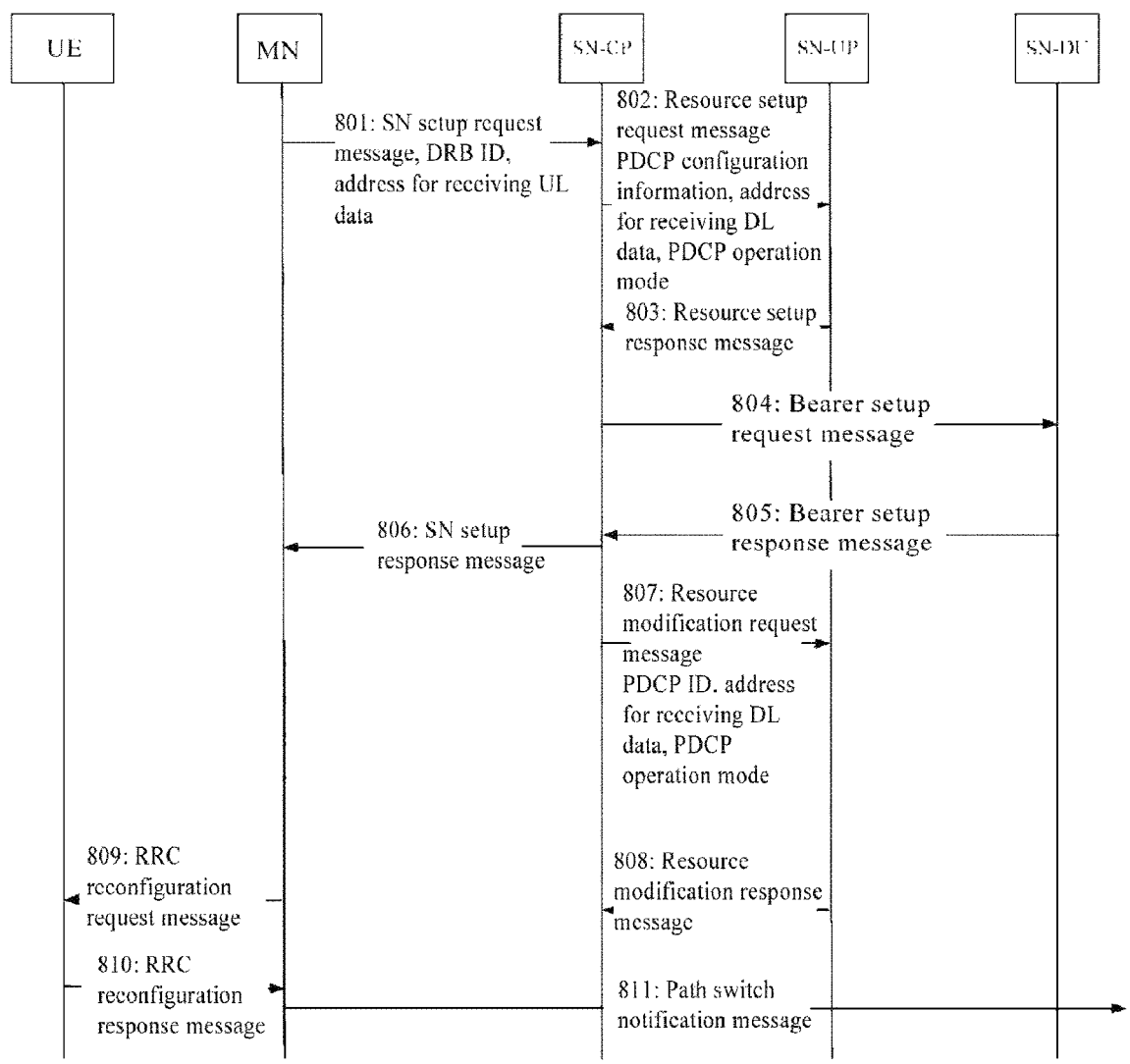
FIG. 8 is an interaction flowchart of DC establishment in a second instance of Embodiment 1 of the present invention.

FIG. 8 (the second instance of Embodiment 1) shows a first method for establishing EN-DC. In the first method, the CP needs to configure a PDCP stack on the UP and indicate a PDCP operation way. In this instance, the MN can be an eNB, and the SN can be a gNB. It is to be noted that, the MN can also be a gNB, and correspondingly, the contents carried in the messages transmitted and received by the MN are changed adaptively; and, the SN can also be an eNB, and correspondingly, the contents carried in the messages transmitted and received by the SN are changed adaptively. However, the embodiments of the present invention are not limited thereto.

It is to be noted that, the first SN setup request message described in Embodiment 1 corresponds to an SN setup request message in step 801 in this embodiment; the first resource setup request message described in Embodiment 1 corresponds to a resource setup request message in step 802 in this embodiment; the first resource setup response message described in Embodiment 1 corresponds to a resource setup response message in step 803 in this embodiment; the first bearer setup request message described in Embodiment 1 corresponds to a bearer setup request message in step 804 in this embodiment; the first bearer setup response message described in Embodiment 1 corresponds to a bearer setup response message in step 805 in this embodiment; the first bearer modification request message described in Embodiment 1 corresponds to a bearer modification request message in step 807 in this embodiment; and, the first bearer modification response message described in Embodiment 1 corresponds to a bearer modification response message in step 808 in this embodiment.

The first method includes the following steps.

Step 801: An MN transmits an SN setup request message to a CP of an SN (a 5G node).

The MN determines to establish a certain bearer on the SN. The bearer may be previously established on a source SN or on the MN, or a new bearer configured by an MME. The SN setup request message contains an identifier of the bearer, and a receiving IP address and a TEID of the bearer in a core network gateway. This message further carries the capability information of a UE. The capability of the UE can be of two types. One type is the capability of the UE in a 5G access network. The capability information is the capability of the UE in the 5G access network and is not applicable to an LTE access network. The other type is the capability of the UE commonly used in both the LTE and the 5G. This capability is applicable to both the LTE and the 5G. This message further carries the type of connection determined by the LTE node. The type of DC established on the SN can be a split bearer, an SCG bearer or an SCG split bearer.

The SN setup request message contains one or more pieces of the following information.

ABbr
The type of a bearer: the type of a bearer can be set as a split bearer type, an SCG bearer type and/or an SCG split bearer type. This message can further set as an MCG split signaling bearer.

Identifier information of the bearer: for example, the identifier information can be an identifier of a DRB. If the MN is a gNB, the identifier of the bearer can be an identifier of a DRB, or an identifier of a QoS flow to be on the SN. The identifier of the QoS flow is transmitted to the MN by the core network. The core network transmits, to the MN and through an initial context setup or an initial context modification process or a data connection process, the identifier of the QoS flow and the QoS corresponding to the identifier of the QoS flow. In addition to the identifier of the data bearer, this message can further carry an SRB identifier of an MCG split signaling bearer, for example, SRB1 or SRB2.

Quality of Service (QoS) parameter of the bearer: the QoS parameter of the bearer contains a QCI, a priority ARP, a maximum uplink/downlink rate of a GBR service, and/or a guaranteed uplink/downlink rate of the GBR service. If the MN is a gNB, the QoS of the bearer can be the QoS corresponding to the QoS flow. The identifier of the QoS flow and the corresponding QoS are transmitted from the core network to the MN; or, the QoS of the bearer is the QoS corresponding to the DRB determined by the MN according to the QoS of the QoS flow.

Aggregate Maximum Bit Rate (AMBR): the AMBR in this message is an AMBR of a non-guaranteed service on the SN determined by the MN. Considering that some non-guaranteed services are on the MN, the AMBR can be set have a value different from the UE AMBR transmitted to the MN by the core network. If all non-guaranteed services are on the SN, the AMBR can be set have a value the same as the UE AMBR transmitted to the MN by the core network. If the non-guaranteed services are on both the MN and the SN, the sum of an AMBR on the MN and an AMBR on the SN does not exceed the total UE AMBR.

Address for uplink data: if the bearer is a split bearer, the address for receiving uplink data is a transport layer address for uplink data TEID (that is a GTP TEID) allocated by the MN; and, if the bearer is an SCG bearer or an SCG split bearer, the address for uplink data is a transport layer address for uplink data TEID allocated by the core network.

Address for downlink data: if the bearer is an SCG split bearer, this message further carries a transport layer address for downlink data TEID. The address for receiving downlink data is an address allocated by the MN and used for receiving downlink data from the SN.

RRC transparent container: the RRC transparent container can contain a measurement report of a UE; and, an identifier of an MCG split SRB and/or configuration information of corresponding layers as an RLC layer and an MAC layer can also be contained in the RRC transparent container.

Step 802: The SN-CP transmits a resource setup request message to an SN-UP.

The message in this step can be used for establishing, in a non-DC mode and by the CP, a PDCP stack for an ordinary data bearer and/or signaling bearer on the UP.

Upon receiving the message in the step 801, the SN-CP determines, according to the type of the bearer carried in the message, whether to perform the step 802. If the type of the bearer to be established in the step 801 is a split bearer, the step 802 will not be executed; and, if the type of the bearer to be established in the step 801 is an SCG bearer or an SCG split bearer, the SN-CP transmits the message in the step 802 to the CN-CP to establish a PDCP layer on the UP. The resource setup request message contains one or more pieces of the following information.

Identifier of a cell: the SN-CP determines to establish a bearer on which cell. The identifier of a cell can be obtained according to the measurement information of the UE received in the step 801 or obtained from the measurement information directly transmitted to the SN by the UE.

Identifier of a UE: the SN-CP indicates that a resource for which UE is to be or modified. The identifier of the UE can be a unique identifier in a cell of the UE, or a unique identifier in the UP, or unique identifier in a network of the UE (for example, a temporary identifier like P-TMSI, or IMSI), or a unique identifier between the CP and the UP; or, the UE is identified by a unique signaling of the UE between the CP and the UP.

Identifier of the bearer or identifier of the PDCP stack, which can be an identifier of a DRB, an identifier of an SRB, or an identifier allocated for the UE by the CP to distinguish different PDCP stacks on the UP. Since one UE has multiple PDCP stacks, each PDCP stack needs to have one identifier, so that CP allocates one identifier for each PDCP stack. Encrypted information and configuration information of the PDCP: the algorithm for encrypting the PDCP is determined by the CP and then transmitted to the UP. The configuration information of the PDCP contains the format of the PDCP, the length of an SN of the PDCP, clock information of the PDCP (e.g., discarded clock length) or other information.

Address for uplink data: the address for uplink data is a transport layer address and a TEID allocated by a user plane of the core network and used for and notifying uplink data transmitted by the UP. After the uplink signaling is processed by the PDCP stack on the UP, the data packet is transmitted to this address.

Address for downlink data: the UP transmits the downlink data packet processed by the PDCP to this address.

If a PDCP of an ordinary data bearer or an SCG bearer is to be established, the address for receiving downlink data should be allocated by the DU. Since the CP has not yet interacted with the DU although the CP has configured resources for the UP first in the first method, in this step, the CP does not know the address for receiving downlink data allocated by the DU.

If a PDCP of an SCG split bearer is to be established, the UP should be configured with two addresses for receiving downlink data. One of the address for receiving downlink data is allocated by the MN, while the other thereof is allocated by the DU. Similarly, only the address for receiving downlink data allocated by the MN transmitted in the step 801 can be carried in the current message, that is, only one valid address for receiving downlink data can be carried in the message.

Since the UP does not know the type of the bearer to be established, the UP cannot distinguish the above situation. Therefore, as a simple operation, the address for receiving downlink data is not contained in this step, or the UP ignores the address for receiving downlink data in this step. Even if the address for receiving downlink data has been received, the UP is temporarily unable to transmit the processed data to this address and waits for another activation command. The activation command can be a step 806 in this embodiment.

Or, in order to decrease the number of signaling, instead of the DU, the CP allocates the address for receiving downlink data. In this case, in the step 804, the CP needs to notify the UP of the address for receiving downlink data allocated by the DU, and the DU receives, according to the address for receiving downlink data allocated by the CP, data transmitted by the UP. In this method, the resource modification process in steps 806 and 807 is not needed.

Or, the resource setup request message carries the type of the bearer to be established. The type of the bearer can indicate that the PDCP to be established is specific for an ordinary data bearer, an SCG bearer or an SCG split bearer; or, the type of the bearer can be an SCG bearer or an SCG split bearer, or an ordinary data bearer in an unspecified case.

PDCP operation indication information: for example, it is indicated that PDCP duplication should be activated/deactivated in downlink, or it is indicated that PDCP needs to split data in downlink. It is also possible to indicate a PDCP duplication activation/deactivation in uplink. Generally, one PDCP in UP is configured with one address for downlink data. However, in some cases, one PDCP can be configured with two addresses for receiving downlink data. There are two different cases: one case is as follows: for an ordinary data bearer or an SCG bearer, a PDCP duplication function is configured by RRC; and, the other case is as follows: for an SCG split bearer, data should be split by the PDCP into two parts. One part of data is transmitted to the MN, while the other part of data is transmitted to the DU of the SN. Therefore, the UP needs to know data splitting or data duplication should be performed on the PDCP. In this embodiment of the present invention, the UP can be notified by the PDCP duplication activation/deactivation indication or the PDCP splitting indication carried in this message, or by the type of the bearer carried in this message. For example, if two addresses for giving downlink data configured and the type of the bearer is an SCG bearer or an ordinary bearer, the PDCP in UP needs to perform duplication function, and the duplicated is transmitted to the two addresses for downlink data. If the bearer type is an SCG split bearer, data splitting needs to be performed on the PDCP in UP, and the split data is transmitted to the two addresses for receiving downlink data.

Step 803: The SN-UP transmits a resource setup response message to the SN-CP, where this message carries information about a successfully established PDCP protocol information, and further carries the address for receiving uplink data allocated by the SN-UP.

Step 804: The SN-CP transmits a bearer setup request to a DU.

The bearer setup request message contains one or more pieces of the following information.

The type of the bearer: the type of the current bearer can be a data bear or a signaling bearer. An interface between the CU and the DU is an F1 interface. The DU needs to know the bearer to be is a data bearer or a signaling bearer. If the bearer to be is a data bearer, a TEID needs to be allocated to the CU and the DU, a corresponding tunnel for each bearer is established between the CU and the DU, and a data packet is transmitted by the tunnel established for the bearer. If the bearer to be is a signaling bearer, an RRC message is transmitted between the CU and the DU through an F1 message. Therefore, it is necessary to notify the DU whether the type of the bearer is a data bearer or a signaling bearer.

Identifier information of a data bearer: the identifier information can be an identifier of a Data Radio Bearer (DRB).

Identifier information of a signaling bearer, for example, SRB1, SRB2 or SRB3.

Configuration information of an RLC/MAC/physical er corresponding to the bearer: here, the bearer can be a data bearer and/or a signaling bearer.

Aggregate Maximum Bit Rate (AMBR): the AMBR in this message is an AMBR of a non-guaranteed service on the SN determined by the MN. If the non-guaranteed service is established on both the MN and the SN, the sum of an AMBR on the MN and an AMBR on the SN does not exceed the total UE AMBR. The DU schedules the UE according to the received AMBR.

Address for uplink data of the bearer: this message needs to carry the DRB ID of the bearer and the address for uplink data corresponding to the bearer, so that DU transmits uplink data to the corresponding address. When an SCG split bearer is to be configured, the uplink data will be transmitted to the SN-UP, and the address for uplink data is a transport layer address and a TEID allocated by the SN-UP; however, when an MCG split bearer is to be configured, the uplink data will be transmitted to the MN, and the address for receiving uplink data is a transport layer address and a TEID allocated by the MN.

Step 805: The DU transmits a bearer setup response message to the SN-CP, where this message carries the address for receiving downlink data allocated by the DU. For one DRB, two data tunnels can be established, and the bearer setup response message contains one or more pieces of the following information.

Identifier of a successfully established bearer: for example, the identifier can be an identifier of a Data Radio Bearer (DRB) or an identifier of a QoS flow to be on the SN.

Address for downlink data: the address for downlink data is allocated by the DU. An entity where the PDCP of the bearer is located needs to transmit data to the address for downlink data by the DU, and the CU is responsible for transmitting the address for downlink data to a corresponding entity.

Step 806: The CP transmits an SN setup response message to the MN.

Step 807: The CP transmits a resource modification request message to the UP. By using this message in this step, the UP is notified that it can begin to transmit data. It is also possible that there is no corresponding response message. Or, the uplink data transmission of the UP is activated by a user plane. For example, the DU transmits a data packet to the UP, and the data packet contains the address for receiving downlink data allocated by the DU. Upon receiving the data packet, the UP can begin to transmit downlink data to the DU.

The resource modification request message contains one or more pieces of the following information.

Identifier of a secondary cell: the SN-CP indicates that a resource for which secondary cell is to be modified.

Identifier of a UE: the SN-CP indicates that a resource for which UE is to be modified.

Identifier of the bearer, which can be an identifier of a data bearer or an identifier of a signaling bearer.

This message carries an address for downlink data. One or two addresses can be contained in this For a same PDCP stack, this message can carry two addresses for downlink data. The two addresses can be allocated by the DU; or, one address is allocated by the MN, while the other address is allocated by the DU.

PDCP operation indication: for example, it is indicated that PDCP duplication should be activated/deactivated in downlink, or it is indicated that PDCP needs to split data in downlink. It is also possible to indicate a PDCP duplication activation/deactivation in uplink. Generally, one PDCP in UP is configured with one address for downlink data; however, in some cases, one PDCP can be configured with two addresses for downlink data. There are two cases: one case is as follows: for an ordinary data bearer or an SCG bearer, a PDCP duplication function is configured by RRC; and, the other case is as follows: for an SCG split bearer, data should be split by the PDCP into two parts. One part of data is transmitted to the MN, while the other part of data is transmitted to the DU of the SN. Therefore, the UP needs to know data splitting or data duplication should be performed on the PDCP. The UP can be notified by the PDCP duplication activation/deactivation indication or the PDCP splitting indication carried in this message, or by the type of the bearer carried in this message. For example, if two addresses for downlink data configured and the type of the bearer is an SCG bearer or an ordinary bearer, the PDCP in UP needs to perform duplication function, and the duplicated is transmitted to the two addresses for downlink data. If the bearer type is an SCG split bearer, data splitting needs to be performed on the PDCP in UP, and the split data is transmitted to the two addresses for downlink data.

Step 808: The UP transmits a resource modification response message to the SN-CP, where the message carries information about a successfully established PDCP information.

For example, an identifier of a cell, an identifier of a UE, an identifier of a bearer, an identifier of a PDCP stack or other information is carried in this message.

Step 809: An MN transmits an RRC reconfiguration request to the UE, where this message contains configuration parameters of radio resources for the UE from the MN and/or the SN.

Step 810: The UE transmits an RRC reconfiguration completion message to the MN. The UE performs radio resource configuration and then transmits an RRC reconfiguration completion message to the MN.

If necessary, the UE performs a random-access process with the SN, so as to realize synchronization with the SN.

In this embodiment of the present invention, after the random-access process is completed, if necessary, the MN can notify the SN of an RRC reconfiguration completion message, or the SN can notify the MN of information about a successful random result.

Step 811: The MN transmits a path switch request to a control node of the core network. This message contains an E-RAB identifier and the corresponding address for receiving downlink data.

The subsequent process is the same as the current process and will not be repeated here.

First Instance of Embodiment 2

In this instance, the MN can be an eNB, and the SN can be a gNB. It is to be noted that, the MN can also be a gNB, and correspondingly, the contents carried in the messages transmitted and received by the MN are changed adaptively; and, the SN can also be an eNB, and correspondingly, the contents carried in the messages transmitted and received by the SN are changed adaptively. However, the embodiments of the present invention are not limited thereto.

Figure 9:
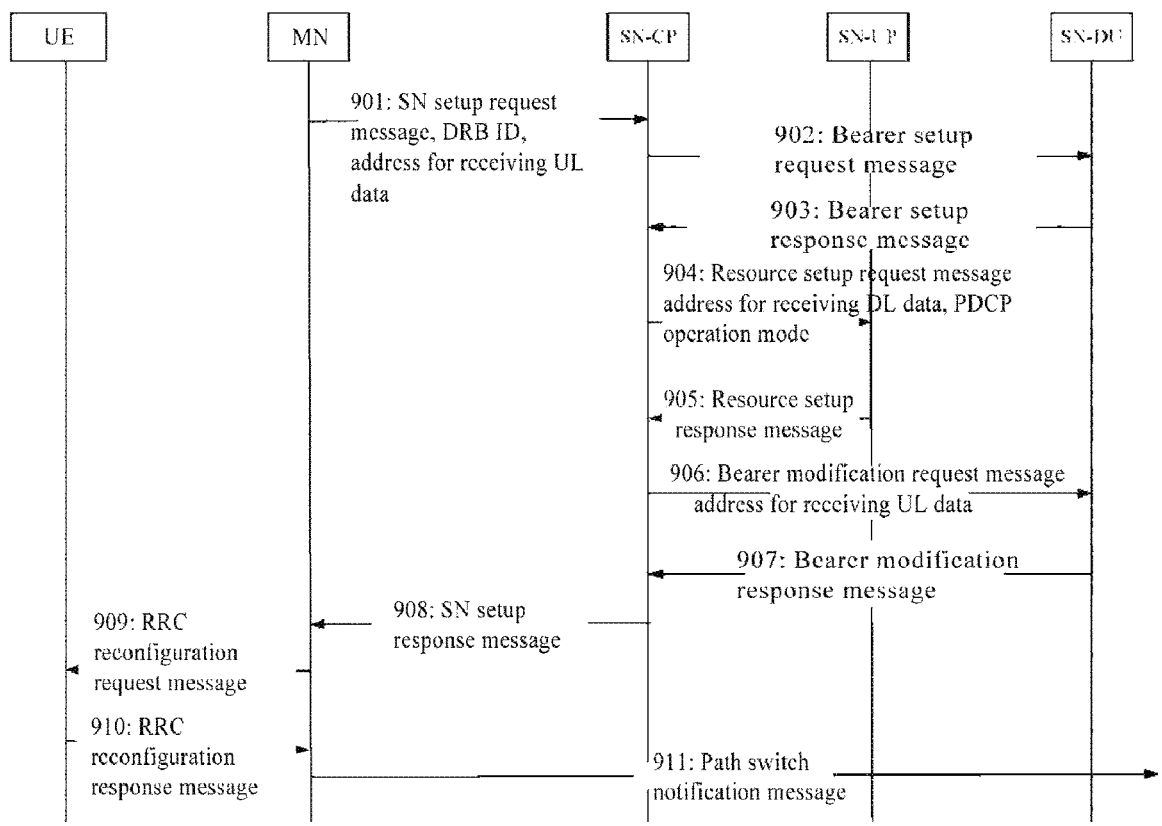
FIG. 9 is an interaction flowchart of DC establishment in a first instance of Embodiment 2 of the present invention.

In the first instance of Embodiment 2, a second method for establishing EN-DC will be described. The SN-CP configures resources on the DU first, and then configures resources on the SN-UP. By the second method, a situation where the CP has not acquired the information (e.g., downlink data reception information) allocated by the DU during the configuration of the UP is avoided, so that, during the updating of configuration defects on the CP after the configuration of the DU, it is not necessary to initiate the modification process in the step 806. The second method in this embodiment includes the following steps, as shown in FIG. 9.

It is to be noted that, the second SN setup request message described in Embodiment 2 corresponds to an SN setup request message in step 901 in this embodiment; the second resource setup request message described in Embodiment 2 corresponds to a resource setup request message in step 904 in this embodiment; the second resource setup response message described in Embodiment 2 corresponds to a resource setup response message in step 905 in this embodiment; the second bearer setup request message described in Embodiment 2 corresponds to a bearer setup request message in step 902 in this embodiment; the second bearer setup response message described in Embodiment 2 corresponds to a bearer setup response message in step 903 in this embodiment; the second bearer modification request message described in Embodiment 2 corresponds to a bearer modification request message in step 906 in this embodiment; and, the second bearer modification response message described in Embodiment 2 corresponds to a bearer modification response message in step 907 in this embodiment.

Step 901: An MN (e.g. an LTE node) transmits an SN setup request message to a CP of an SN (e.g. a 5G node).

The MN determines to establish a certain bearer on the SN. The bearer may be previously established on a source SN or on the MN, or a new bearer configured by an MME.

In this embodiment of the present invention, the SN setup request message contains an identifier of the bearer, and a receiving IP address and a TEID of the bearer in a core network gateway. This message further carries the capability information of a UE. The capability of the UE can be of two types. One type is the capability of the UE in a 5G access network. The capability information is the capability of the UE in the 5G access network and is not applicable to an LTE access network. The other type is the capability of the UE commonly used in both the LTE and the 5G. This capability is applicable to both the LTE and the 5G. This message further carries the type of connection determined by the LTE node. The type of DC established on the SN can be a split bearer, an SCG bearer or an SCG split bearer.

The SN setup request message contains one or more pieces of the following information.

- The type corresponding to the bearer to be the type corresponding to the bearer to be can be set as a split bearer type, an SCG bearer type or an SCG split bearer type. This message can further set as an MCG split signaling bearer.
- Identifier information corresponding to the bearer to be for example, the identifier information can be an identifier of a Data Radio Bearer (DRB). If the MN is a gNB, the identifier corresponding to the bearer can be an identifier of a DRB, or an identifier of a QoS flow to be on the SN. The identifier of the QoS flow is transmitted to the MN by the core network. The core network transmits, to the MN and through an initial context setup or an initial context modification process or a data connection process, the identifier of the QoS flow and the QoS corresponding to the identifier of the QoS flow. In addition to the identifier of the data bearer, this message can further carry an SRB identifier of an MCG split signaling bearer, for example, SRB1 or SRB2.
- Quality of Service (QoS) parameter of the bearer: the QoS parameter of the bearer contains a QCI, a priority ARP, a maximum uplink/downlink rate of a GBR service, and a guaranteed uplink/downlink rate of the GBR service. The QoS of the bearer can be the QoS corresponding to the QoS flow. The identifier of the QoS flow and the corresponding QoS are transmitted from the core network to the MN. The QoS of the bearer can also be the QoS corresponding to a DRB determined by the MN according to the QoS of the QoS flow.
- Aggregate Maximum Bit Rate (AMBR): the AMBR in this message is an AMBR of a non-guaranteed service on the SN determined by the MN. Considering that some non-guaranteed services are on the MN, the AMBR can be set have a value different from the UE AMBR transmitted to the MN by the core network. If all non-guaranteed services are on the SN, the AMBR can be set have a value the same as the UE AMBR transmitted to the MN by the core network. If the non-guaranteed services are both the MN and the SN, the sum of an AMBR on the MN and an AMBR on the SN does not exceed the total UE AMBR.
- Address for uplink data: if the bearer is a split bearer, the address for receiving uplink data is a transport layer address for uplink data TEID (i.e. GTP TEID) allocated by the MN; and, if the bearer is an SCG bearer or an SCG split bearer, the address for uplink data is a transport layer address for receiving uplink data TEID allocated by the core network.
- Address for downlink data: if the bearer is an SCG split bearer, this message further carries a transport layer address for downlink data TEID. The address for downlink data is an address allocated by the MN and used for downlink data from the SN.
- RRC transparent container information: the RRC transparent container can contain a measurement report of a UE; and, an identifier of an MCG split SRB and/or configuration information of corresponding layers as a RLC layer and an MAC layer can also be set in the RRC transparent container.

Step 902: The SN-CP transmits a bearer setup request message to a DU to establish a UE context on a DU and resources corresponding to a DRB of the UE.

The bearer setup request message contains one or more pieces of the following information.

- The type of the bearer: the type of the current bearer can be a data bear or a signaling bearer. An interface between the CU and the DU is an F1 interface. The DU needs to know the bearer to be is a data bearer or a signaling bearer. If the bearer to be is a data bearer, a TEID needs to be allocated to the CU and the DU, a corresponding tunnel for each bearer is established between the CU and the DU, and a data packet is transmitted by the tunnel established for the bearer. If the bearer to be is a signaling bearer, an RRC message is transmitted between the CU and the DU through an F1 message. Therefore, it is necessary to notify the DU whether the type of the bearer is a data bearer or a signaling bearer.
- Identifier information of a data bearer: the identifier information can be an identifier of the DRB.
- Identifier information of a signaling bearer, for example, SRB1, SRB2 or SRB3.
- Configuration information of an RLC/MAC/physical corresponding to the bearer: here, the bearer can be a data bearer and/or a signaling bearer.
- Aggregate Maximum Bit Rate (AMBR): the AMBR in this message is an AMBR of a non-guaranteed service on the SN determined by the MN. If the non-guaranteed service is established on both the MN and the SN, the sum of an AMBR on the MN and an AMBR on the SN does not exceed the total UE AMBR. In this embodiment of the present invention, the DU schedules the UE according to the received AMBR.

Address for uplink data of the bearer: this message needs to carry the DRB ID of the bearer and the address for uplink data corresponding to the bearer, so that DU transmits uplink data to the corresponding address.

When a non-DC ordinary data bearer is to be configured, the address for receiving uplink data is a transport layer address and a TEID allocated by the UP. In the second method, the address has not been obtained.

When an SCG split bearer is to be configured, the address for receiving uplink data is a transport layer address and a TEID allocated by the SN-UP. In the second method, the address has not been obtained.

When an MCG split bearer is to be configured, uplink data will be transmitted to the MN, and the address for receiving uplink data is a transport layer address and a TEID allocated by the MN.

Since the DU does not know the type of the bearer to be established, the DU cannot distinguish the above situations. Therefore, as a simple operation, the downlink receiving address is not contained in this step, or the DU ignores the address for receiving downlink data in this step. Even if the address for receiving uplink data has been received, the DU is temporarily unable to transmit the processed uplink data to the address for receiving uplink data and waits for another activation command. The activation command can be a step 906 in this embodiment.

Or, in order to decrease the number of signalings, instead of the UP, the CP allocates an address for receiving uplink data. If the CP instead of the UP allocates the address for receiving uplink data, in the step 604, the CP needs to notify the UP of the address for receiving uplink data allocated by the UP, and the UP receives, according to the address for receiving uplink data allocated by the CP, data transmitted by the DU. In this step, the bearer modification process in steps 1006 and 1007 is not needed.

Or, in order to decrease the number of signalings, the CP notifies the DU of the type of the bearer to be established, i.e., indicating whether the bearer to be established is an ordinary bearer, an SCG bearer or an SCG split bearer, or indicating whether the bearer to be established is a split bearer (i.e., indicating whether the bearer to be established is a split bearer or a non-split bearer). If the bearer to the established is a split bearer, the DU considers that the address for receiving uplink data in this step is valid, the data is directly transmitted to this address without waiting; however, if the bearer to be established is a bearer of other type, another activation command is needed. Other notification methods are not excluded. For example, the DU is notified whether to ignore the address for receiving uplink data; or, only for the split bearer, the address for receiving uplink data is contained in this message.

Step 903: The DU transmits a bearer setup response message to the SN-CP.

In this embodiment of the present invention, the bearer setup response message carries the address for receiving downlink data allocated by the DU. For one DRB, two data tunnels can be established. The bearer setup request message contains one or more pieces of the following information.

Identifier corresponding to a successfully established bearer: for example, the identifier can be an identifier of a Data Radio Bearer (DRB) or an identifier of a QoS flow to be on the SN.

Address for downlink data: the address for downlink data is allocated by the DU. An entity where the PDCP of the bearer is located needs to transmit data to the address for downlink data by the DU, and the CU is responsible for transmitting the address for downlink data to a corresponding entity.

Step 904: The SN-CP transmits a resource setup request message to a UP.

The resource setup request message contains one or more pieces of the following information.

Identifier of a cell: the SN-CP determines to establish a bearer on which cell. The identifier of a cell can be obtained according to the measurement information of the UE received in the step 901 or obtained from the measurement information directly transmitted to the SN by the UE.

Identifier of a UE: the SN-CP indicates that a resource for a certain UE is to be or modified. The identifier of the UE can be a unique identifier in a cell of the UE, or a unique identifier in the UP, or a unique identifier in a network of the UE (for example, a temporary identifier like P-TMSI, or IMSI), or a unique identifier between the CP and the UP; or, the UE is identified by a unique signaling of the UE between the CP and the UP.

Identifier of the bearer or identifier of the PDCP stack, which can be an identifier of a data bearer, an identifier of a signaling bearer, or an identifier allocated for the UE by the CP to distinguish different PDCP stacks on the UP. Since one UE has multiple PDCP stacks, each PDCP stack needs to have one identifier, so that the CP allocates one identifier for each PDCP stack.

Encrypted information and configuration information of the PDCP: the algorithm for encrypting the PDCP is determined by the CP and then transmitted to the UP, the configuration information of the PDCP contains the format of the PDCP, the length of an SN of the PDCP, clock information of the PDCP (e.g., discarded clock length) or other information.

Address for uplink data: the address for uplink data is a transport layer address and a TEID allocated by a user plane of the core network and used for and notifying uplink data transmitted by the UP. After the uplink signaling is processed by the PDCP stack on the UP, the data packet is transmitted to this address.

Address for receiving downlink data: the UP transmits the downlink data packet processed by the PDCP to this address. One or two addresses for downlink data can be carried. For an ordinary data bearer, the address for downlink data should be allocated by the DU. If a PDCP stack of an SCG split bearer is to be the UP should be configured with two addresses for downlink data. One of the two addresses for receiving downlink data is allocated by the MN, while the other thereof is allocated by the DU.

PDCP operation indication information: for example, it is indicated that PDCP duplication should be activated/deactivated in downlink, or it is indicated that PDCP needs to split data in downlink. It is also possible to indicate a PDCP duplication activation/deactivation in uplink. Generally, one PDCP in UP is configured with one address for downlink data; however, in some cases, one PDCP can be configured with two addresses for downlink data. There are two cases: one case is as follows: for an ordinary data bearer or an SCG bearer, PDCP duplication function is configured by RRC; and, the other case is as follows: for an SCG split bearer, data should be split by the PDCP into two parts. One part of data is transmitted to the MN, while the other part of data is transmitted to the DU of the SN.

Therefore, the UP needs to know data splitting or data duplication should be performed on the PDCP. The UP can be notified by the PDCP duplication activation/deactivation indication or the PDCP splitting indication in this message, or by the type of the bearer carried in this message. For example, if two addresses for downlink data configured and the type of the bearer is an SCG bearer or an ordinary bearer, the PDCP in UP needs to perform duplication function, and the duplicated is transmitted to the two addresses for downlink data. If the bearer type is an SCG split bearer, data splitting needs to be performed on the PDCP in UP, and the split data is transmitted to the two addresses for downlink data.

Step 905: The UP transmits a resource setup response message to the CP.

The resource setup response message carries information about a successfully established PDCP information. The resource setup response message further carries the address for receiving uplink data allocated by the UP.

Step 906: The CP transmits a bearer modification request message to the DU.

The bearer modification request message carriers a DRB identifier and the corresponding address for receiving uplink data. By using this message in this step, the DU is notified that it can begin to transmit uplink data. It is also possible that there is no corresponding response message. Or, the uplink data transmission of the DU is activated by a user plane. For example, the UP transmits a data packet to the DU. The data packet contains the address for receiving uplink data allocated by the UP. Upon receiving the data packet, the DU can begin to transmit uplink data to the UP.

Step 907: The DU transmits a bearer modification response message to the CP.

Step 908: The CP transmits an SN setup response message to the MN.

Step 909: The MN transmits an RRC reconfiguration request message to the UE.

The reconfiguration request message contains configuration parameters of radio resources for the UE from the MN and the SN.

Step 910: The UE transmits an RRC reconfiguration completion message to the MN.

Wherein the UE transmits a reconfiguration completion message to the base station after performing radio resource configuration.

Wherein the UE can perform a random-access process with the SN, and performs synchronization with the SN. After the random-access process is completed, the MN can notify the SN of an RRC reconfiguration completion message, or the SN can notify the MN of information about a successful random result.

Step 911: The MN transmits a path switch request message to a control node of the core network.

The path switch request message carriers an E-RAB identifier and the corresponding address for receiving downlink data. The subsequent process is the same as the current process and will not be repeated here.

In Embodiments 2 and 3, how to establish DC in EN-DC in an architecture where the MN is an LTE eNB and the SN is divided into a CP, UP and a DU has been described. In another architecture where the MN is a 5G gNB and the SN is an eNB or a gNB, the DC established for the UE is called NE-DC. In the NE-DC, if the MN is divided into a CP, a UP and a DU (hereinafter referred to as an MN-CP, an MN-UP and an MN-DU, respectively), the current DC establishment and maintenance process is not applicable to this architecture and needs to be enhanced. Hereinafter, the master node can also be referred to as an MN, and the secondary node can also be referred to as an SN. The DC can be established by two methods. The first method is as follows: resources on the MN are configured first, and resources on the SN are then configured. The second method is as follows: resources on the SN are configured first, and resources on the MN are then configured. In Embodiments 4 and 5, how to establish DC in an architecture where the MN is divided into a CP, a UP and a DU will be described. The first method will be described in Embodiment 4, as shown in FIG. 10; and, the second method will be described in Embodiment 5, as shown in FIG. 11.

First Instance of Embodiment 3

Figure 10:
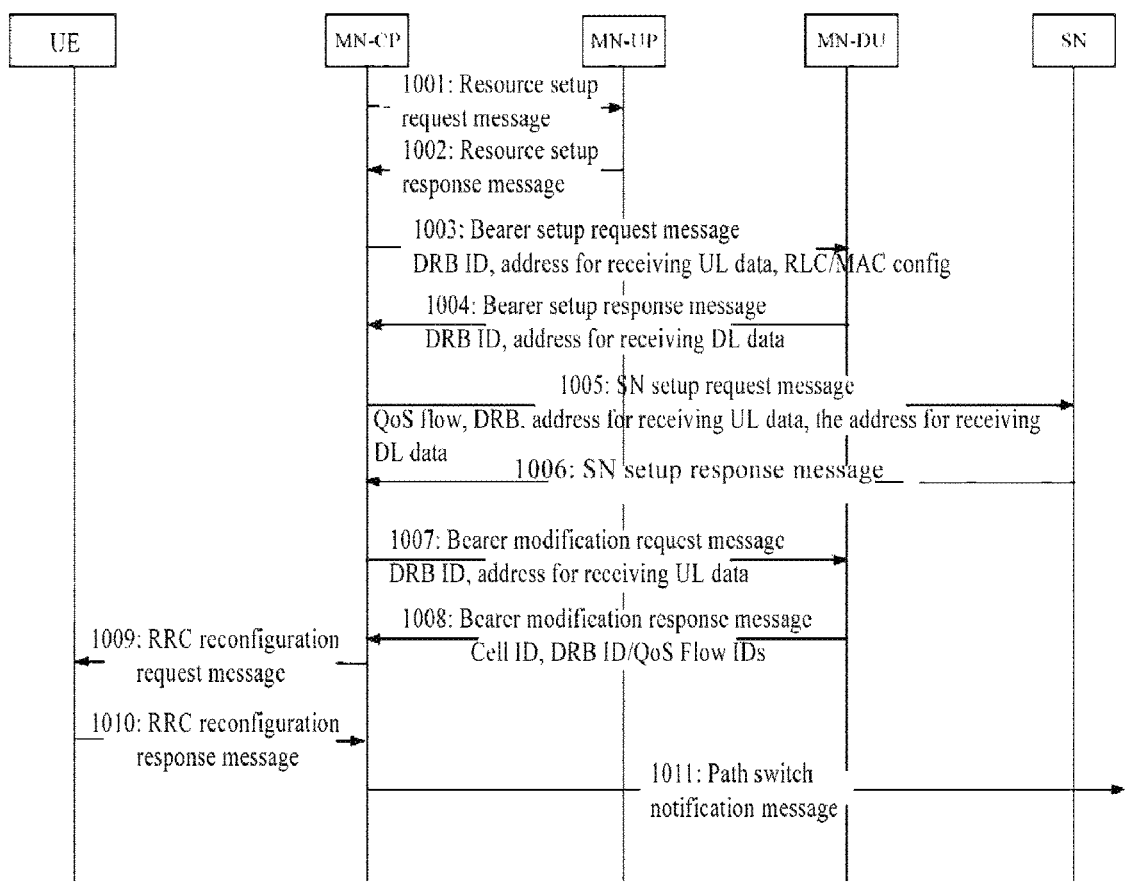
FIG. 10 is an interaction flowchart of DC establishment in a first instance of Embodiment 3 of the present invention.
Figure 11:
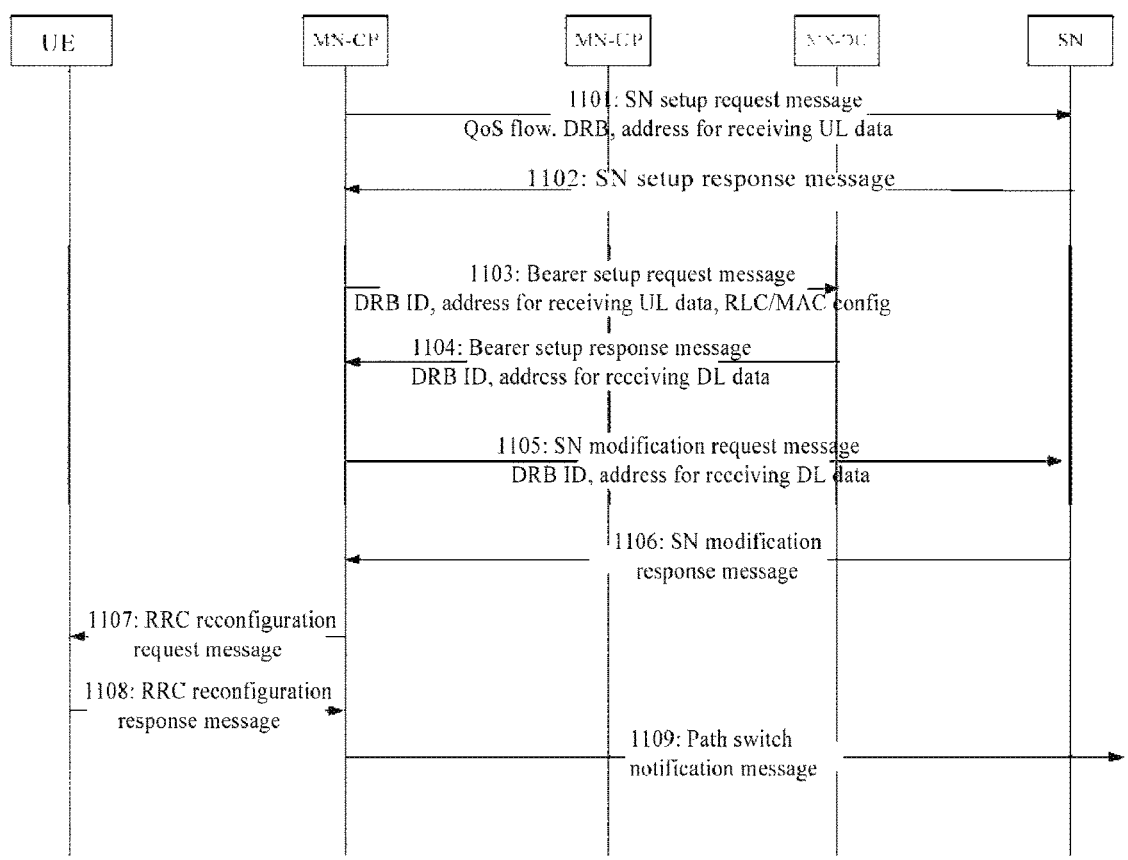
FIG. 11 is an interaction flowchart of DC establishment in a first instance of Embodiment 4 of the present invention.

The first instance of Embodiment 3 is shown in FIG. 10.

It is to be noted that, the third SN setup request message described in Embodiment 3 corresponds to an SN setup request message in step 1005 in this embodiment; the third resource setup request message described in Embodiment 3 corresponds to a resource setup request message in step 1001 in this embodiment; the third resource setup response message described in Embodiment 3 corresponds to a resource setup response message in step 1002 in this embodiment; the third bearer setup request message described in Embodiment 3 corresponds to a bearer setup request message in step 1003 in this embodiment; the third bearer setup response message described in Embodiment 3 corresponds to a bearer setup response message in step 1004 in this embodiment; the third bearer modification request message described in Embodiment 3 corresponds to a bearer modification request message in step 1007 in this embodiment; and, the third bearer modification response message described in Embodiment 3 corresponds to a bearer modification response message in step 1008 in this embodiment.

Step 1001: An MN-CP transmits a resource setup request message to an MN-UP.

In this embodiment of the present invention, after the MN receives, from a core network, a message of establishing data connection, the MN can determine to establish a data bearer on the MN, and the MN-CP transmits a resource request message to the MN-UP. If the MN directly determines to establish a DC bearer and determines whether the type of the bearer is an SCG bearer or an SCG split bearer, the steps 1001 and 1002 will be omitted.

The resource setup request message contains one or more pieces of the following information.

Identifier of a cell: the MN-CP determines to establish a bearer on which cell, and the identifier of a cell can be obtained according to the measurement information from the MN to the UE.

Identifier of the UE: the MN-CP indicates that a resource for which UE is to be or modified. The identifier of the UE can be a unique identifier in a cell of the UE, or a unique identifier in the UP, or a unique identifier in a network of the UE (for example, a temporary identifier like P-TMSI, or IMSI), or a unique identifier between the CP and the UP; or, the UE is identified by a unique signaling of the UE between the CP and the UP.

Identifier corresponding to the bearer or identifier of the PDCP stack, which can be an identifier of a data bearer, an identifier of a signaling bearer, or an identifier allocated for the UE by the CP to distinguish different PDCP stacks on the UP. Since one UE has multiple PDCP stacks, each PDCP stack needs to have one identifier, so that CP allocates one identifier for each PDCP stack.

Encrypted information and configuration information of the PDCP: the algorithm for encrypting the PDCP is determined by the CP and then transmitted to the UP, The configuration information of the PDCP contains the format of the PDCP, the length of an SN of the PDCP, clock information of the PDCP (e.g., discarded clock length) or other information.

Address for giving uplink data: the address for uplink data is a transport layer address and a TEID allocated by a user plane of the core network and used for and notifying uplink data transmitted by the UP. After the uplink signaling is processed by the PDCP stack on the UP, the data packet is transmitted to this address.

Step 1002: The MN-UP transmits a resource setup response message to the MN-CP.

The resource setup response message carries information about a successfully established PDCP information. The resource setup response message further carries the address for receiving uplink data allocated by the MN-UP.

Step 1003: The MN-CP transmits a bearer setup request to an MN-DU.

The bearer setup request message contains one or more pieces of the following information.

The type of the bearer to be the type of the bearer to be can be set as a split bearer type, an SCG bearer type, an SCG split bearer type, an MCG split SRB type or an SCG SRB type.

Identifier corresponding to the bearer to be here, the identifier can be an identifier of a Data Radio Bearer (DRB) or an identifier of a QoS flow. For an SCG split bearer, the data is transmitted from the core network to the SN, and the SN performs data splitting. One part of data is transmitted to the MN-DU. Since the MN-CP configures the resources on the DU first and then configures a DRB on the DU, the MN-CP will determine a mapping from the QoS flow to the DRB. The MN-CP receives, from the core network, the configuration information of the data connection, including the identifier of the QoS flow and the QoS of the QoS flow, so that MC-CP can determine which QoS flows to be mapped to a same DRB.

Configuration information of RLC, MAC and physical the configuration information is configuration information of RLC, MAC and other protocol of this DRB.

Aggregate Maximum Bit Rate (AMBR): the AMBR in this message is an AMBR of a non-guaranteed service on the DU determined by the MN. The DU schedules uplink resources of the UE according to the AMBR.

Address for uplink data: if this message needs to carry the DRB ID of the bearer and the address for uplink data corresponding to the bearer, the DU transmits uplink data to the corresponding address.

When the MN-CP needs to configure resources for an ordinary bearer or a split bearer, the address for receiving uplink data is allocated by the MN-UP.

When the MN-CP needs to configure resources for an SCG or SCG split bearer, since the MN-CP configures the resources of the MN-DU first, the address for receiving uplink data which should be allocated by the SN has not been obtained. The uplink data should be transmitted to the SN.

Since the DU does not know the type of the bearer to be established, the DU cannot distinguish the above situations.

If the type of the bearer is not carried in this message, the address for receiving uplink data is not contained in the message in this step; or, this message carries a false or null address for receiving uplink data, or, a special address for receiving uplink data is set, and the DU ignores the address for receiving uplink data carried in this message. Even if the address for receiving uplink data is set as a special address for receiving has been received, the DU is temporarily unable to transmit the processed uplink data to the address for receiving uplink data and waits for another activation command. The activation command can be a step 1107 in this embodiment.

Or, in order to decrease the number of signalings, the CP notifies the DU of the type of the bearer to be established, i.e., indicating whether the bearer to be established is an ordinary bearer, an SCG bearer, an SCG split bearer or a split bearer. If the bearer to the established is an ordinary bearer or a split bearer, the DU determines that the address for receiving uplink data in this step is valid and can directly transmit data to this address without waiting; however, if the bearer to be established is a bearer of other type, another activation command is needed. Other notification methods are not excluded. For example, the DU is notified whether to ignore the address for receiving uplink data; or, only for the ordinary bearer or split bearer, the address for receiving uplink data is contained in this message.

Step 1004: The MN-DU transmits a bearer setup response message to the MN-CP.

The bearer setup response message contains one or more pieces of the following information.

The type of the bearer: the type of the bearer can be set as a split bearer type, an SCG bearer type, an SCG split bearer type, an MCG split SRB type or an SCG SRB type.

Identifier of the bearer: here, the identifier can be an identifier of a Data Radio Bearer (DRB) or an identifier of a QoS flow.

Address for downlink data: the address for downlink data is allocated by the DU. An entity where the PDCP of the bearer is located needs to transmit data to the address for downlink data by the DU. The MN-CP is responsible for transmitting the address for receiving downlink data to the corresponding entity.

Step 1005: The MN-CP transmits an SN setup request message to an SN.

The SN setup request message contains one or more pieces of the following information.

The type corresponding to the bearer to be the type corresponding to the bearer to be can be set as a split bearer type, an SCG bearer type or an SCG split bearer type.

Identifier corresponding to the bearer to be here, the identifier can be an identifier of a Data Radio Bearer (DRB), an identifier of a QoS flow and/or a PDU session ID.

Quality of Service (QoS) parameter of the bearer: the QoS parameter of the bearer can be the QoS parameter of a DRB, and the parameter contains at least one of the QoS information or QCI corresponding to the QoS flow, a priority ARP, a maximum uplink/downlink rate of a GBR service, and a guaranteed uplink/downlink rate of the GBR service.

Aggregate Maximum Bit Rate (AMBR): the AMBR in this message is an AMBR of a non-guaranteed service on the SN determined by the MN. Considering that some non-guaranteed services are on the MN, the AMBR can be set have a value different from the UE AMBR transmitted to the MN by the core network. If all non-guaranteed services are on the SN, the AMBR can be set have a value the same as the UE AMBR transmitted to the MN by the core network. If the non-guaranteed services are on both the MN and the SN, the sum of an AMBR on the MN and an AMBR on the SN does not exceed the total UE AMBR.

Address for uplink data: if the bearer to be is a split bearer, the address for uplink data is a transport layer address for uplink data TEID (i.e. GTP TEID) allocated by the MN. If the bearer to be ished is an SCG bearer or an SCG split bearer, the address for uplink data is a transport layer address for uplink data TEID allocated by the core network.

Address for downlink data: if the bearer to be is an SCG split bearer, the address for downlink data needs to be carried in this message. In this embodiment, the address for downlink data is a transport layer address for downlink data TEID allocated by the MN-DU.

Information about mapping from the QoS flow to the DRB: For an SCG split bearer, since the MN-CP has configured the resources on the DU, the data received from the core network by the MN-CP is a QoS flow packet, and a DRB is configured on the DU. Therefore, even if an SCG split bearer needs to be configured, the MN-CP has also determined information about mapping from the QoS flow to the DRB. The mapping information to be notified to the SN, so that SN configures the SDAP and PDCP by using the same mapping information, and the QoS of the data can be RRC transparent container: the RRC transparent container can contain a measurement report of the UE. The identifier of the MCG split SRB and the configuration information of corresponding RLC, MAC or other layers can also be set in the RRC transparent container.

Step 1006: The SN transmits an SN setup response message to the MN.

The SN setup response message carries one or more pieces of the following information:

an identifier corresponding to a successfully established bearer: here, the identifier can be an identifier of a Data Radio Bearer (DRB), an identifier of a QoS flow and/or a PDU session ID;

an RRC transparent container: the RRC transparent container can contain configuration information of the UE; and an address for receiving uplink data: if the bearer is an SCG split bearer, the MN-DU needs to transmit data to the SN, and the address for receiving uplink data which is allocated by the SN is used for receiving the data transmitted by the MN-DU.

Step 1007: The MN-CP transmits a bearer modification request to the MN-DU.

In this embodiment of the present invention, the MN-CP transmits a bearer modification request to notify the MN-DU of a correct address for receiving uplink data, i.e., the received transport layer address and TEID which are allocated to the SCG split bearer by the SN and transmitted from the MN-DU. By using the message in this step, the DU is also notified that it can begin to transmit uplink data. It is also possible that there is no corresponding response message. Or, the uplink data transmission of the DU is activated by a user plane. For example, the UP or the SN transmits a data packet to the DU. The data packet contains the address for receiving uplink data allocated by the UP or the SN. Upon receiving the data packet, the DU can begin to transmit uplink data to the UP or the SN.

Step 1008: The MN-DU transmits a bearer modification response message to the MN-CP.

Step 1009: The MN-CP transmits an RRC reconfiguration request message to the UE.

The RRC reconfiguration request message contains configuration parameters of radio resources for the UE from the MN and the SN.

Step 1010: The UE transmits an RRC reconfiguration completion message to the MN. The UE transmits a response message to the base station after performing radio resource configuration.

If necessary, the UE performs a random-access process with the SN, and performs synchronization with the SN. After the random-access process is completed, the MN can notify the SN of an RRC reconfiguration completion message, or the SN can notify the MN of information about a successful random result.

Step 1011: The MN transmits a path switch request message to a control node of the core network.

The path switch request message contains an identifier of a data connection PDU Session and the corresponding address for receiving downlink data, i.e., a transport layer IP address and a TEID. If in a DC mode, a same PDU Session can be configured with two addresses for receiving downlink data. One of the two addresses is allocated by the MN, while the other thereof is allocated by the SN. This message carries the identifier of the PDU Session, the identifier of the QoS flow and the corresponding address for receiving downlink data.

First Instance of Embodiment 4

In the first instance of Embodiment 4, a second DC establishment method will be described. As shown in FIG. 11, the method in the first instance of Embodiment 4 includes the following steps.

It is to be noted that, the third SN setup request message described in Embodiment 4 corresponds to an SN setup request message in step 1005 in this embodiment; the fourth SN setup request message described in Embodiment 4 corresponds to an SN setup request message in step 1101 in this embodiment; the fourth SN setup response message described in Embodiment 4 corresponds to an SN setup response message in step 1102 in this embodiment; the fourth bearer setup request message described in Embodiment 4 corresponds to a bearer setup request message in step 1103 in this embodiment; the fourth SN response request message described in Embodiment 4 corresponds to an SN setup request message in step 1104 in this embodiment; and, the fourth SN modification request message described in Embodiment 4 corresponds to an SN modification request message in step 1105 in this embodiment.

Step 1101: An MN-CP transmits an SN setup request message to an SN.

In this embodiment of the present invention, the MN-CP can establish a bearer on an MN first, and then the MN wants to establish DC for the bearer; or, the MN determines to establish DC when the MN receives a data connection setup request message from the core network, so that the MN-CP initiates the step 1101.

The SN setup request message contains one or more pieces of the following information.

The type corresponding to the bearer to be the type of the bearer to be established can be set as a split bearer type, an SCG bearer type or an SCG split bearer type.

Identifier of the bearer: here, the identifier can be an
identifier of a Data Radio Bearer (DRB), an identifier
of a QoS flow, and/or a PDU Session ID.
QoS parameter of the bearer: the parameter can be the
QoS information corresponding to the QoS flow and
the QoS parameter of a DRB. The QoS parameter of the
DRB contains at least one of a QCI, a priority ARP, a
maximum uplink/downlink rate of a GBR service, and
a guaranteed uplink/downlink rate of the GBR service.
Aggregate Maximum Bit Rate (AMBR): the AMBR in the
SN setup request message is an AMBR of a non-
guaranteed service on the SN determined by the MN.
Considering that some non-guaranteed services are on
the MN, the AMBR can be set have a value different
from the UE AMBR transmitted to the MN by the core
network. If all non-guaranteed services are on the SN,
the AMBR can be set have a value the same as the UE
AMBR transmitted to the MN by the core network. If
the non-guaranteed services are established on both the
MN and the SN, the sum of an AMBR on the MN and
an AMBR on the SN does not exceed the total UE
AMBR.
Address for uplink data.
If the bearer is a split bearer, the address for receiving
uplink data is a transport layer address for receiving
uplink data and a TEID (i.e. GTP TEID) allocated by
the UP of the MN. If the MN has established a bearer
and the DC is established for this bearer, the CP of the
MN has acquired the address for receiving uplink data
allocated by the UP. If no bearer has been established
on the MN, the MN determines to establish DC upon
receiving a data connection setup command from the
core network. In this case, the CP may not acquire the
address for receiving uplink data allocated by the UP.
If the bearer is an SCG bearer or an SCG split bearer, the
address for receiving uplink data is a transport layer
address for receiving uplink data and a TEID allocated
by the core network. The CP has acquired the address
for receiving uplink data from the core network and
stores the address for receiving uplink data in a context
of the UE.
For a split bearer, since the SN knows the type of the
bearer to be established, the address for receiving
uplink data is not contained in the message of this step;
or, this message carries a false or null address for
receiving uplink data or a special address for receiving
uplink data, and the SN ignores the address for receiv-
ing uplink data carried in this message. Even if the
address for receiving uplink data has been received, the
SN is temporarily unable to transmit the processed
uplink data to the address for receiving uplink data and
waits for another activation command. The activation
command can be a step 1105 in this embodiment.
Address for receiving downlink data of a split bearer: if
the bearer is an SCG split bearer, the address for
receiving downlink data also needs to be carried. In this
embodiment, the address for receiving downlink data is
a transport layer address for receiving downlink data
and a TEID allocated by the MN-DU. If the MN-CP
configures the resource on the SN first, in this step, the
MN-CP has not acquired the address for receiving
downlink data allocated by the MN-DU.
For an SCG split bearer, since the SN knows the type of
the bearer to be established, the address for receiving
downlink data is not contained in the message of this
step; or, this message carries a false or null address for
receiving downlink data, and the SN ignores the
address for receiving downlink data carried in this
message. Even if the address for receiving downlink
data has been received, the SN is temporarily unable to
transmit the processed uplink data to the address for
receiving downlink data and waits for another activa-
tion command. The activation command can be a step
1105 in this embodiment.
RRC transparent container: the RRC transparent con-
tainer can contain a measurement report of the UE. The
identifier of the MCG split SRB and/or the configura-
tion information of corresponding RLC, MAC or other
layers can also be contained in the RRC transparent
container.

Step 1102: The SN transmits an SN setup response
message to the MN.

The SN setup response message carries one or more
pieces of the following information.

Identifier of a successfully established bearer: here, the
identifier can be an identifier of a Data Radio Bearer
(DRB), an identifier of a QoS flow and/or a PDU
session ID.
Mapping from the QoS flow to the DRB: for an SCG split
bearer, if the SN has determined the mapping from the
QoS flow to the DRB, the SN needs to notify the MN
(MN-CP) of this mapping; and, the MN (MN-CP)
determines the QoS of the SCG split bearer on the MN
according to the mapping, then configures an RLC
layer, an MAC layer and a physical according to the
QoS, and transmits a message in the step 1103 to
configure the MN-DU.
RRC transparent container: the RRC transparent con-
tainer can contain configuration information of the UE.
Address for uplink data: if the bearer is an SCG split
bearer, the MN-DU needs to transmit data to the SN,
and the address for uplink data which is allocated by the
SN is used for the data transmitted by the MN-DU.

Step 1103: The MN-CP transmits a bearer setup request
message to an MN-DU.

The bearer setup request message contains one or more
pieces of the following information.

The type of the bearer to be the type of the bearer to be
can be set as a split bearer type, an SCG bearer type, an
SCG split bearer type, an MCG split SRB type or an
SCG SRB type.
Identifier of the bearer to be here, the identifier can be an
identifier of a Data Radio Bearer (DRB) or an identifier
of a QoS flow.
Configuration information of the RLC layer, the MAC
layer and the physical layer: The configuration infor-
mation is configuration information of the RLC layer,
the MAC layer and other protocol of the DRB. For an
SCG split bearer, data is transmitted to the SN from the
core network, and the SN performs data splitting. One
part of data is transmitted to the MN-DU. The MN-CP
determines the configuration information of the RLC
layer, the MAC layer and the physical on the MN-DU.
The MN-CP can determine, according to the mapping
from the QoS flow to the DRB in the step 1202 and the
QoS of the QoS flow received from the core network,
the configuration information of the RLC layer, the
MAC layer and the physical on the MN-DU.
Aggregate Maximum Bit Rate (AMBR): the AMBR in
this message is an AMBR of a non-guaranteed service
on the DU determined by the MN. The DU schedules
uplink resources of the UE according to the AMBR.
Address for uplink data: if this message needs to carry the
DRB ID of the bearer and the address for uplink data corresponding to the bearer, the DU transmits uplink data to the corresponding address. When the MN-CP needs to configure an SCG split bearer, the address for ving uplink data is allocated by the SN, and the MN acquires this address from the message in the step 1102. When the MN-CP wants to configure an MCG split bearer, the uplink data needs to be transmitted to the MN-UP, and the address for uplink data is an address for data by the MN-UP.

Step 1104: The MN-DU transmits a bearer setup response message to the MN-CP.

The bearer setup response message contains one or more pieces of the following information.

The type of the bearer: the type of the bearer can be set as a split bearer type, an SCG bearer type, an SCG split bearer type, an MCG split SRB type or an SCG SRB type.

Identifier of the bearer: here, the identifier can be an identifier of a Data Radio Bearer (DRB) or an identifier of a QoS flow.

Address for downlink data: the address for downlink data is allocated by the DU. An entity where the PDCP of the bearer is located needs to transmit data to the address for downlink data which is allocated by the DU. The MN-CP is responsible for transmitting the address for downlink data to the corresponding entity.

Step 1105: The MN-CP transmits an SN modification request message to the SN.

In this embodiment of the present invention, the MN-CP transmits an SN modification request to notify the SN of a correct address for receiving uplink or downlink data. By using the message in this step, the SN is also notified that it can begin to transmit uplink data or downlink data. It is also possible that there is no corresponding response message. Or, the uplink or downlink data transmission of the SN is activated by a user plane. For example, the UP of the MN transmits a data packet to the SN, and the data packet contains the allocated address for receiving uplink data; or, the DU of the MN transmits a data packet to the SN, and the data packet contains the allocated address for receiving downlink data. Upon receiving this data packet, the SN can begin to transmit uplink data to the UP or transmit downlink data to the DU.

Step 1106: The SN transmits an SN modification response message to the MN-CP.

Step 1107: The MN-CP transmits an RRC reconfiguration request message to the UE.

The RRC reconfiguration request message contains configuration parameters of radio resources for the UE from the MN and the SN.

Step 1108: The UE transmits an RRC reconfiguration completion message to the MN.

The UE transmits a response message to the base station after performing radio resource configuration.

If necessary, the UE performs a random-access process with the SN, and performs synchronization with the SN.

In this embodiment of the present invention, after the random-access process is completed, the MN can notify the SN of an RRC reconfiguration completion message, or the SN can notify the MN of information about a successfully random result.

Step 1109: The MN transmits a path switch request message to a control node of the core network.

In this embodiment of the present invention, the path switch request message contains an identifier of a data connection PDU Session and the corresponding address for receiving downlink data, i.e., a transport layer IP address and a TEID. If in a DC mode, a same PDU Session can be configured with two addresses for receiving downlink data. One of the two addresses is allocated by the MN, while the other thereof is allocated by the SN. This message carries the identifier of the PDU Session, the identifier of the QoS flow and the corresponding address for receiving downlink data.

It is to be noted that, in the foregoing embodiments, the architecture of the SN is a CU and a DU, wherein the CU includes a CP and a UP; or, the architecture of the MN is a CU and a DU, wherein the CU includes a CP and a UP. Actually, it is also possible that the architecture of each of the MN and the SN contains a CU and a DU, wherein the CU can be further divided into a CP and a UP. In this architecture, the implementation method is a combination of the foregoing embodiments and will not be repeated here.

Embodiment 5

Figure 12:
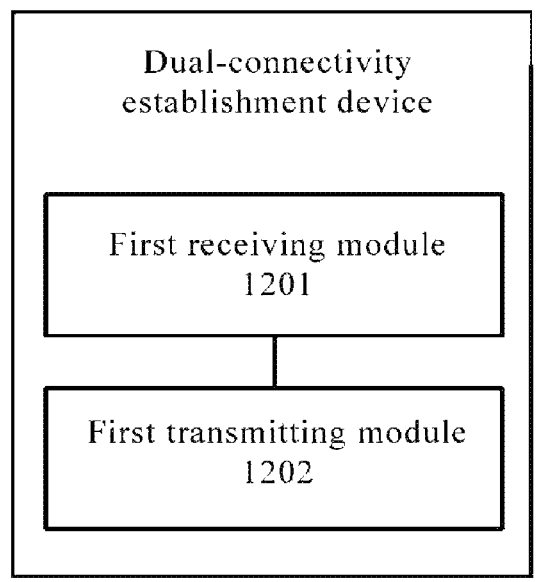
FIG. 12 is a schematic structure diagram of a DC establishment device according to Embodiment 5 of the present invention.

This embodiment of the present invention provides a dual-connectivity (DC) establishment device, as shown in FIG. 12, which is applied to a first DC architecture. The first DC architecture includes a Master Node (MN) and a Secondary Node (SN), wherein the SN includes a Central Unit (CU) and a Distributed Unit (DU); and, the CU includes a Control Plane functional entity (CP) and a User Plane functional entity (UP). The device includes a first receiving module 1201 and a first transmitting module 1202, wherein:

The first receiving module 1201 is configured to receive a first SN setup request message transmitted by an MN, and further configured to receive a second SN setup request message transmitted by the MN.

The first transmitting module 1202 is configured to transmit a first resource setup request message to an SN-UP according to the first SN setup request message, and further configured to transmit a second bearer setup request message to an SN-DU according to the second SN setup request message.

The first receiving module 1201 is further configured to receive a first resource setup response message transmitted by the SN-UP, and further configured to transmit a second resource setup request message to the SN-UP.

The first transmitting module 1202 is further configured to transmit a first bearer setup request message to the SN-DU, and further configured to transmit a second bearer setup request message to the SN-DU according to the second SN setup request message.

The first receiving module 1201 is further configured to receive a first bearer setup response message transmitted by the SN-DU, and further configured to receive a second resource setup response message transmitted by the SN-UP.

The DC establishment device provided in this embodiment of the present invention can execute the method embodiments 1 and 2, and will not be repeated here.

First Instance of Embodiment 5

Figure 13:
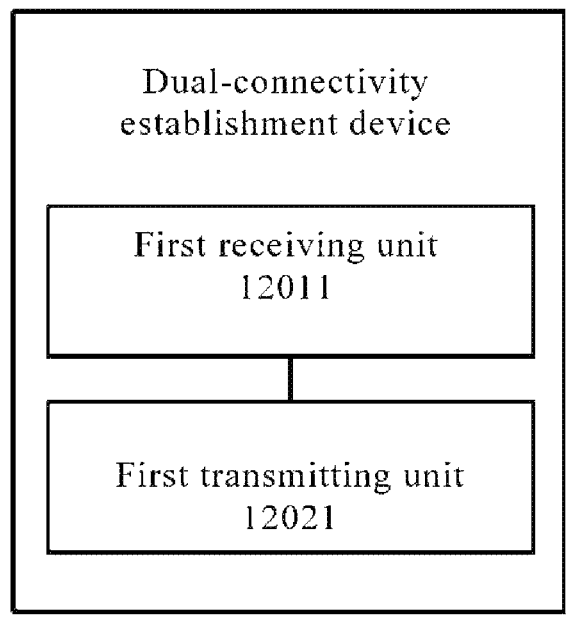
FIG. 13 is a schematic structure diagram of a DC establishment device in a first instance of Embodiment 5 of the present invention.

This instance provides a dual-connectivity (DC) establishment device, as shown in FIG. 13, which is applied to a first DC architecture. The first DC architecture includes a Master Node (MN) and a Secondary Node (SN), wherein the SN includes a Central Unit (CU) and a Distributed Unit (DU); and, the CU includes a Control Plane functional entity (CP) and a User Plane functional entity (UP). Based on the schematic structure diagram shown in FIG. 12, the first receiving module 1201 can be specifically a first receiving unit 12011, and the first transmitting module 1202 can be specifically a first transmitting unit 12021, wherein:

The first receiving unit 12011 is configured to receive a first SN setup request message transmitted by an MN.

The first transmitting unit 12021 is configured to transmit a first resource setup request message to an SN-UP according to the first SN setup request message.

The first receiving unit 12011 is further configured to receive a first resource setup response message transmitted by the SN-UP.

The first transmitting unit 12021 is further configured to transmit a first bearer setup request message to an SN-DU.

The first receiving unit 12011 is further configured to receive a first bearer setup response message transmitted by the SN-DU.

The embodiment of the present invention provides a DC establishment device. Compared with the prior art, this embodiment of the present invention is applied to a first DC architecture. The first DC architecture includes an MN and an SN, wherein the SN includes a CU and a DU; and, the CU includes a CP and a UP. An SN-CP receives a first SN setup request message transmitted by an MN; then, transmits a first resource setup request message to an SN-UP according to the first SN setup request message, and receives a first resource setup response message transmitted by the SN-UP; and, transmits a first bearer setup request message to an SN-DU, and receives a first bearer setup response message transmitted by the SN-DU. Therefore, for the CU and the DU, the DC establishment is realized in the architecture where the CU is further divided into a CP and a UP.

The DC establishment device in this instance can execute the method embodiment 1, and will not be repeated here.

Second Instance of Embodiment 5

Figure 14:
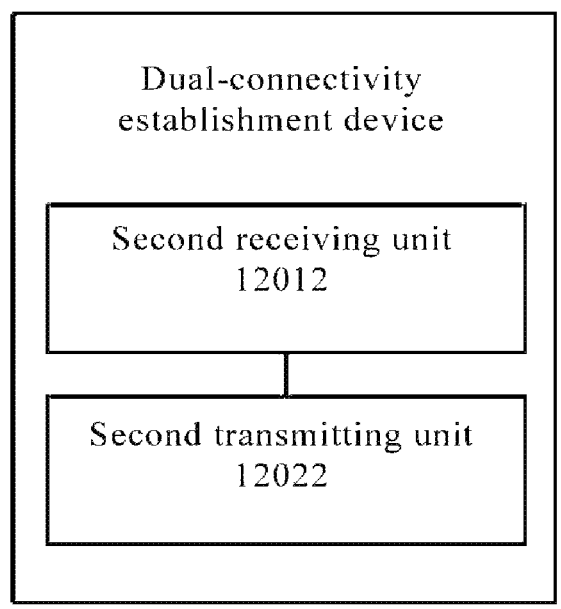
FIG. 14 is a schematic structure diagram of a DC establishment device in a second instance of Embodiment 5 of the present invention.

This embodiment of the present invention provides a DC establishment device, as shown in FIG. 14, which is applied to a first DC architecture. The first DC architecture includes a Master Node (MN) and a Secondary Node (SN), wherein the SN includes a Central Unit (CU) and a Distributed Unit (DU); and, the CU includes a Control Plane functional entity (CP) and a User Plane functional entity (UP). Based on the schematic structure diagram shown in FIG. 12, the first receiving module 1201 can be specifically a second receiving unit 12012, and the first transmitting module 1202 can be specifically a second transmitting unit 12022, wherein:

The second receiving unit 12012 is configured to receive a second SN setup request message transmitted by an MN.

The second transmitting unit 12022 is configured to transmit a second bearer setup request message to an SN-DU according to the second SN setup request message.

The second receiving unit 12012 is further configured to receive a second bearer setup response message transmitted by the SN-DU.

The second transmitting unit 12022 is further configured to transmit a second resource setup request message to an SN-UP.

The second receiving unit 12012 is further configured to receive a second resource setup response message transmitted by the SN-UP.

This embodiment of the present invention provides a DC establishment device. Compared with the prior art, this embodiment of the present invention is applied to a first DC architecture. The first DC architecture includes an MN and an SN, wherein the SN includes a CU and a DU; and, the CU includes a CP and a UP. An SN-CP receives a second SN setup request message transmitted by an MN; then, transmits a second bearer setup request message to an SN-DU according to the second SN setup request message and receives a second bearer setup response message transmitted by the SN-DU; and, transmits a second resource setup request message to an SN-UP and receives a second resource setup response message transmitted by the SN-UP. Therefore, for the CU and the DU, the DC establishment is realized in the architecture where the CU is further divided into a CP and a UP.

The DC establishment device in this instance can execute the method embodiment 2, and will not be repeated here.

Embodiment 6

Figure 15:
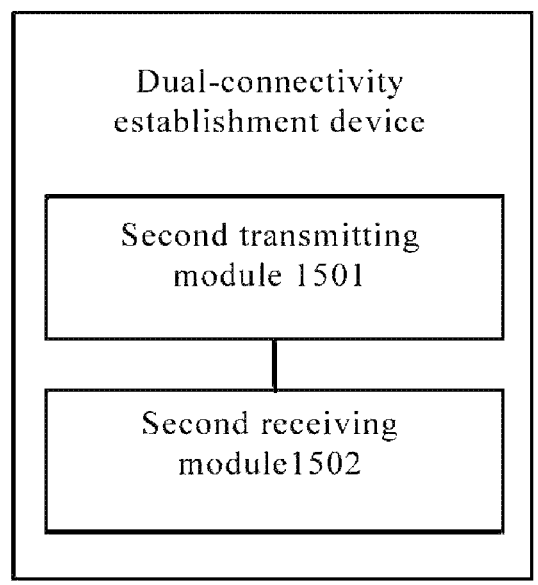
FIG. 15 is a schematic structure diagram of another DC establishment device according to Embodiment 6 of the present invention.

This embodiment of the present invention provides a DC establishment device, as shown in FIG. 15, which is applied to a second dual-system architecture. The second dual-system architecture includes a Master Node (MN) and a Secondary Node (SN), wherein the MN includes a Central Unit (CU) and a Distributed Unit (DU); and, the CU includes a Control Plane functional entity (CP) and a User Plane functional entity (UP). The device includes a second transmitting module 1501 and a second receiving module 1502, wherein:

The second transmitting module 1501 is configured to transmit a third bearer setup request message to an MN-DU, and further configured to transmit a fourth SN setup request message to an SN.

The second receiving module 1502 is further configured to receive a third bearer setup response message transmitted by the MN-DU, and further configured to receive a fourth SN setup response message transmitted by the SN.

The second transmitting module 1501 is configured to transmit a third SN setup request message to the SN, and further configured to transmit a fourth bearer setup request message to the MN-DU.

The second receiving module 1502 is further configured to receive a third SN setup response message transmitted by the SN, and further configured to receive a fourth bearer setup response message transmitted by the MN-DU.

The DC establishment device provided in this embodiment of the present invention can execute the method embodiments 3 and 4, and will not be repeated here.

First Instance of Embodiment 6

Figure 16:
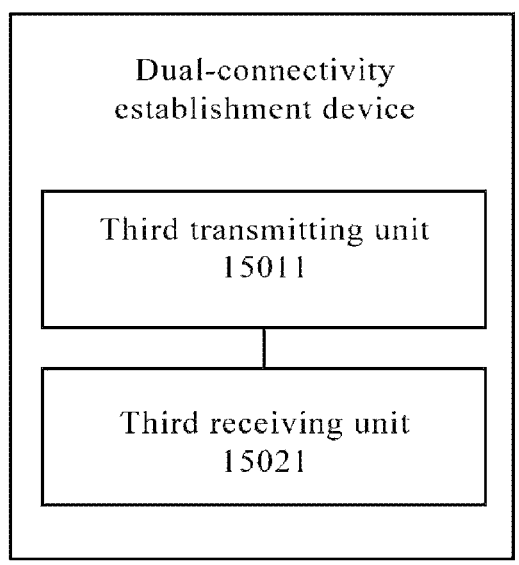
FIG. 16 is a schematic structure diagram of a DC establishment device in a first instance of Embodiment 6 of the present invention.

This embodiment of the present invention provides a DC establishment device, as shown in FIG. 16, which is applied to a second dual-system architecture. The second dual-system architecture includes a Master Node (MN) and a Secondary Node (SN), wherein the MN includes a Central Unit (CU) and a Distributed Unit (DU); and, the CU includes a Control Plane functional entity (CP) and a User Plane functional entity (UP). The second transmitting module 1501 can be specifically a third transmitting unit 15011, and the second receiving module 1502 can be specifically a third receiving unit 15021, wherein:

The third transmitting unit 15011 is configured to transmit a third bearer setup request message to an MN-DU.

The third receiving unit 15021 is configured to receive a third bearer setup response message transmitted by the MN-DU.

The third transmitting unit 15011 is further configured to transmit a third SN setup request message to an SN.

The third receiving unit 15021 is further configured to receive a third SN setup response message transmitted by the SN.

This embodiment of the present invention provides a DC establishment device. Compared with the prior art, this embodiment of the present invention is applied to a second dual-system architecture. The second dual-system architecture includes an MN and an SN, wherein the MN includes a CU and a DU; and, the CU includes a CP and a UP. An MN-CP transmits a third bearer setup request message to an MN-DU and receives a third bearer setup response message transmitted by the MN-DU; and then, transmits a third SN setup request message to an SN and receives a third SN setup response message transmitted by the SN. Therefore, for the CU and the DU, the DC establishment is realized in the architecture where the CU is further divided into a CP and a UP.

The DC establishment device in this instance can execute the method embodiment 3, and will not be repeated here.

Second Instance of Embodiment 6

Figure 17:
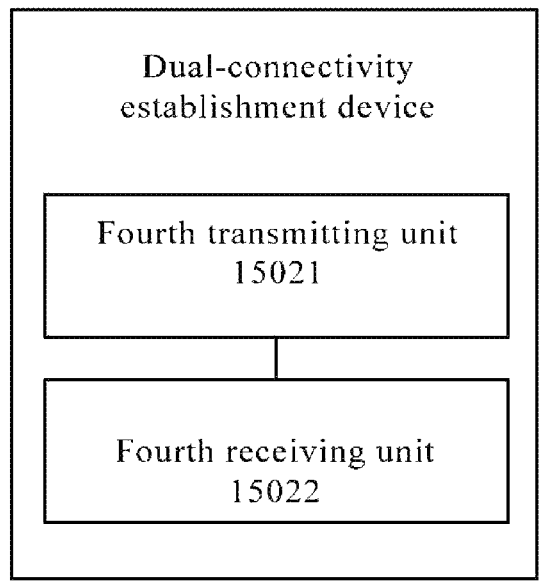
FIG. 17 is a schematic structure diagram of a DC establishment device in a second instance of Embodiment 6 of the present invention.

This embodiment of the present invention provides a DC establishment device, as shown in FIG. 17, which is applied to a second dual-system architecture. The second dual-system architecture includes a Master Node (MN) and a Secondary Node (SN), wherein the MN includes a Central Unit (CU) and a Distributed Unit (DU); and, the CU includes a Control Plane functional entity (CP) and a User Plane functional entity (UP). Based on the schematic structure diagram shown in FIG. 15, the second transmitting module 1501 can be specifically a fourth transmitting unit 15012, and the second receiving module 1502 can be specifically a fourth receiving unit 15022, wherein:

The fourth transmitting unit 15012 is configured to transmit a fourth SN setup request message to an SN.

The fourth receiving unit 15022 is configured to receive a fourth SN setup response message transmitted by the SN.

The fourth transmitting unit 15012 is further configured to transmit a fourth bearer setup request message to an MN-DU.

The fourth receiving unit 15022 is further configured to receive a fourth bearer setup response message transmitted by the MN-DU.

This embodiment of the present invention provides a DC establishment device. Compared with the prior art, this embodiment of the present invention is applied to a second dual-system architecture. The second dual-system architecture includes an MN and an SN, wherein the MN is a gNB, and the SN is an LTE node or a gNB; the MN includes a CU and a DU; and, the CU includes a CP and a UP. An MN-CP transmits a fourth SN setup request message to an SN and receives a fourth SN setup response message transmitted by the SN; and then, transmits a fourth bearer setup request message to an MN-DU and receives a fourth bearer setup response message transmitted by the MN-DU. Therefore, for the CU and the DU, the dual-connectivity establishment is realized in the architecture where the CU is further divided into a CP and a UP.

The DC establishment device in this instance can execute the method embodiment 4, and will not be repeated here.

Figure 18:
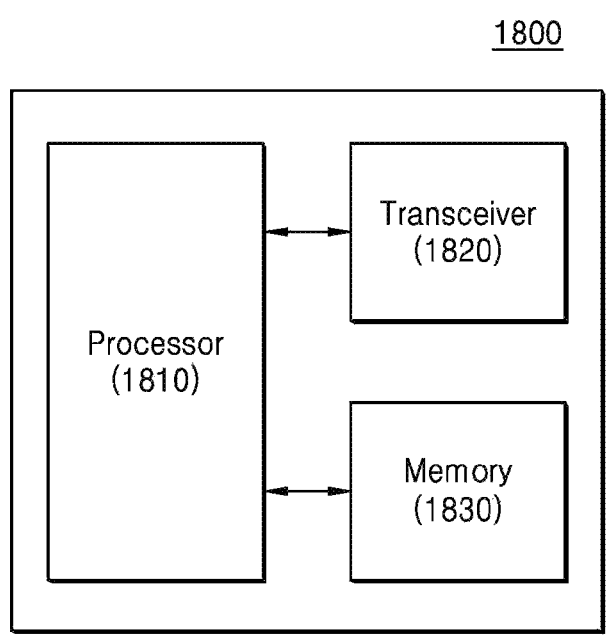
FIG. 18 is a block diagram illustrating a base station according to another exemplary embodiment of the present disclosure.

FIG. 18 is a block diagram illustrating a base station according to another exemplary embodiment of the present disclosure.

Referring to the FIG. 18, the device 1800 may include a processor 1810, a transceiver 1820 and a memory 1830. However, all of the illustrated components are not essential. The device 1800 may be implemented by more or less components than those illustrated in FIG. 18. In addition, the processor 1810 and the transceiver 1820 and the memory 1830 may be implemented as a single chip according to another embodiment.

The aforementioned components will now be described in detail.

The processor 1810 may include one or more processors or other processing devices that control the proposed function, process, and/or method. Operation of the device 1800 may be implemented by the processor 1810.

The processor 1810 may, by a Control Plane functional entity of a Secondary Node, receive a first Secondary Node setup request message transmitted by a Master Node, transmit a first resource setup request message to a User Plane functional entity of the Secondary Node according to the first SN setup request message, receive a first resource setup response message transmitted by the User Plane functional entity of the Secondary Node, transmit a first bearer setup request message to a Distributed Unit of the Secondary Node, and receive a first bearer setup response message transmitted by the Distributed Unit of the Secondary Node.

The transceiver 1820 may include a RF transmitter for up-converting and amplifying a transmitted signal, and a RF receiver for down-converting a frequency of a received signal. However, according to another embodiment, the transceiver 1820 may be implemented by more or less components than those illustrated in components.

The transceiver 1820 may be connected to the processor 1810 and transmit and/or receive a signal. The signal may include control information and data. In addition, the transceiver 1820 may receive the signal through a wireless channel and output the signal to the processor 1810. The transceiver 1820 may transmit a signal output from the processor 1810 through the wireless channel.

The memory 1830 may store the control information or the data included in a signal obtained by the device 1800. The memory 1830 may be connected to the processor 1810 and store at least one instruction or a protocol or a parameter for the proposed function, process, and/or method. The memory 1830 may include read-only memory (ROM) and/or random access memory (RAM) and/or hard disk and/or CD-ROM and/or DVD and/or other storage devices.

Figure 19:
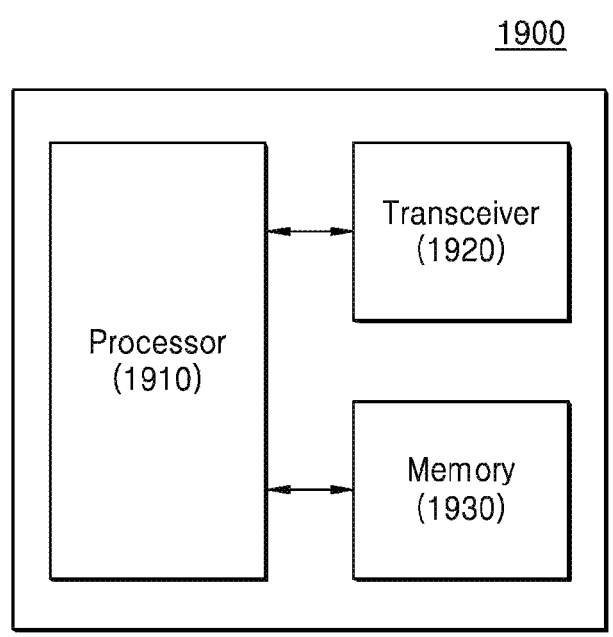
FIG. 19 is a block diagram illustrating a UE according to another exemplary embodiment of the present disclosure.

FIG. 19 is a block diagram illustrating a UE according to another exemplary embodiment of the present disclosure.

Referring to the FIG. 19, the device 1900 may include a processor 1910, a transceiver 1920 and a memory 1930. However, all of the illustrated components are not essential. The device 1900 may be implemented by more or less components than those illustrated in FIG. 19. In addition, the processor 1910 and the transceiver 1920 and the memory 1930 may be implemented as a single chip according to another embodiment.

The aforementioned components will now be described in detail.

The processor 1910 may include one or more processors or other processing devices that control the proposed function, process, and/or method. Operation of the device 1900 may be implemented by the processor 1910.

The transceiver 1920 may include a RF transmitter for up-converting and amplifying a transmitted signal, and a RF receiver for down-converting a frequency of a received signal. However, according to another embodiment, the transceiver 1920 may be implemented by more or less components than those illustrated in components.

The transceiver 1920 may be connected to the processor 1910 and transmit and/or receive a signal. The signal may include control information and data. In addition, the transceiver 1920 may receive the signal through a wireless channel and output the signal to the processor 1910. The transceiver 1920 may transmit a signal output from the processor 1910 through the wireless channel.

The memory 1930 may store the control information or the data included in a signal obtained by the device 1900. The memory 1930 may be connected to the processor 1910 and store at least one instruction or a protocol or a parameter for the proposed function, process, and/or method. The memory 1930 may include read-only memory (ROM) and/or random access memory (RAM) and/or hard disk and/or CD-ROM and/or DVD and/or other storage devices.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

It should be understood by those skilled in the art that the present invention involves apparatuses for performing one or more of operations as described in the present invention. Those apparatuses may be specially designed and manufactured as intended, or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present invention may be alternated, changed, combined or deleted. Further, the operations, methods, other steps in the flows, measures and solutions already discussed in the present invention may also be alternated, changed, rearranged, decomposed, combined or deleted. Further, prior arts having the operations, methods, the steps in the flows, measures and solutions already discussed in the present invention may also be alternated, changed, rearranged, decomposed, combined or deleted.

The foregoing descriptions are merely preferred embodiments of the present invention. It should be noted that, for a person of ordinary skill in the art, various modifications and embellishments can be made without departing from the principle of the present invention. Such modifications and embellishments shall be regarded as falling into the protection scope of the present invention.

The invention claimed is:

1. A method, performed by a central unit (CU) entity of a secondary base station in a wireless communication system, the method comprising:
   receiving, from a master base station, secondary base station setup request information;
   transmitting, from a control plane (CP) of the CU entity to a user plane (UP) of the CU entity, a setup request message based on the secondary base station setup request information; and
   transmitting, from the UP to the CP, a setup response message as a response to the setup request message.

2. The method of claim 1, wherein the setup request message comprises at least one of an identifier corresponding to a user equipment (UE), security information of a packet data convergence protocol (PDCP), transport layer information for uplink data, or PDCP configuration information.

3. The method of claim 2, wherein the transport layer information for uplink data includes a transport layer address and a tunnel endpoint identifier (TEID).

4. The method of claim 1,
   wherein the setup request message is a first setup request message, and
   wherein the method further comprises transmitting, from the CU entity to a distributed unit (DU) entity of the secondary base station, a second setup request message.

5. The method of claim 4, wherein the second setup request message comprises at least one of an identifier of a data radio bearer (DRB), aggregate maximum bit rate (AMBR) information, or transport layer information for uplink data.

6. The method of claim 4,
   wherein the setup response message is a first setup response message, and
   wherein the method further comprises receiving, from the DU entity, a second setup response message as a response to the second setup request message.

7. The method of claim 6, wherein the second setup response message comprises transport layer information for downlink data.

8. The method of claim 1, further comprising:
   transmitting, from the CP to the UP, a modification request message comprising transport layer information for downlink data.

9. The method of claim 8, further comprising:
   transmitting, from the UP to the CP, a modification response message as a response to the modification request message.

10. A central unit (CU) entity of a secondary base station in a wireless communication system, the CU comprising:
    a transceiver; and
    at least one processor coupled with the transceiver and configured to:
      receive, from a master base station, secondary base station setup request information, transmit, from a control plane (CP) of the CU entity to a user plane (UP) of the CU entity, a setup request message based on the secondary base station setup request information, and transmit, from the UP to the CP, a setup response message as a response to the setup request message.

11. The CU of claim 10, wherein the setup request message comprises at least one of an identifier corresponding to a user equipment (UE), security information of a packet data convergence protocol (PDCP), transport layer information for uplink data, or PDCP configuration information.

12. The CU of claim 11, wherein the transport layer information for uplink data includes a transport layer address and a tunnel endpoint identifier (TEID).

13. The CU of claim 10,
wherein the setup request message is a first setup request message, and
wherein the at least one processor is further configured to transmit, from the CU entity to a distributed unit (DU) entity of the secondary base station, a second setup request message.

14. The CU of claim 13, wherein the second setup request message comprises at least one of an identifier of a data radio bearer (DRB), aggregate maximum bit rate (AMBR) information, or transport layer information for uplink data.

15. The CU of claim 13,
wherein the setup response message is a first setup response message, and
wherein the at least one processor is further configured to receive, from the DU entity, a second setup response message as a response to the second setup request message.

16. The CU of claim 15, wherein the second setup response message comprises a second address for downlink data.

17. The CU of claim 10, wherein the at least one processor is further configured to transmit, from the CP to the UP, a modification request message comprising transport layer information for downlink data.

18. The CU of claim 17, wherein the at least one processor is further configured to:
transmit, from the UP to the CP, a modification response message as a response to the modification request message.

* * * * *